(12) United States Patent
Hotani et al.

(10) Patent No.: US 9,016,058 B2
(45) Date of Patent: Apr. 28, 2015

(54) VEHICLE BRAKING FORCE GENERATOR

(71) Applicant: Honda Motor Co., Ltd., Tokyo (JP)

(72) Inventors: Yuki Hotani, Saitama (JP); Yuki Ito, Saitama (JP); Daisuke Sakamoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/944,236

(22) Filed: Jul. 17, 2013

(65) Prior Publication Data

US 2014/0020378 A1 Jan. 23, 2014

(30) Foreign Application Priority Data

Jul. 19, 2012 (JP) ................................. 2012-161019

(51) Int. Cl.
*B60T 13/74* (2006.01)
*B60T 8/88* (2006.01)
*B60T 8/40* (2006.01)

(52) U.S. Cl.
CPC ................ *B60T 13/745* (2013.01); *B60T 8/88* (2013.01); *B60T 8/4081* (2013.01)
USPC .......................................................... 60/545

(58) Field of Classification Search
CPC ........ B60T 8/4081; B60T 8/88; B60T 13/745
USPC ................... 60/534, 545, 581, 582, 591, 403; 303/11, 15, 122.11, 113.3, 113.4, 303/114.1, 114.2
See application file for complete search history.

(56) References Cited

U.S. PATENT DOCUMENTS

| 5,609,399 | A | 3/1997 | Feigel et al. |
|---|---|---|---|
| 6,132,012 | A | 10/2000 | Ishii |
| 6,158,822 | A | 12/2000 | Shirai et al. |
| 6,382,737 | B1 | 5/2002 | Isono et al. |
| 6,899,403 | B2 | 5/2005 | Isono et al. |
| 8,226,176 | B2 | 7/2012 | Hatano |
| 2012/0151914 | A1* | 6/2012 | Nishioka et al. ............... 60/545 |
| 2013/0231839 | A1 | 9/2013 | Baehrle-Miller et al. |
| 2014/0210253 | A1 | 7/2014 | Okano et al. |

FOREIGN PATENT DOCUMENTS

| DE | 43 10 061 A1 | 9/1994 |
|---|---|---|
| DE | 197 03 838 A1 | 8/1998 |

(Continued)

OTHER PUBLICATIONS

German Office Action issued Jun. 26, 2014 in the corresponding DE Patent Application 10 2013 214 212.9.

*Primary Examiner* — Dwayne J White
*Assistant Examiner* — Logan Kraft
(74) *Attorney, Agent, or Firm* — Carrier Blackman & Associates, P.C.; Joseph P. Carrier; Anne G. Sabourin

(57) ABSTRACT

The object of the present invention is to provide a vehicle braking force generator capable of detecting a lock failure quickly. A vehicle braking force generator includes a motor cylinder device that generates a brake hydraulic pressure according to an operation amount of a brake pedal, a motor current obtaining unit that obtains a torque current according to an electric motor, a brake hydraulic pressure obtaining unit that obtains a brake hydraulic pressure generated in a cylinder unit, a movement amount obtaining unit that obtains a movement amount of pistons to a compression direction of a brake fluid relative to the cylinder unit, and a determination unit that determines an operation state of the motor cylinder device.

5 Claims, 11 Drawing Sheets

(56) References Cited

FOREIGN PATENT DOCUMENTS

| | | |
|---|---|---|
| DE | 100 44 223 A1 | 4/2001 |
| DE | 102 33 196 A1 | 2/2003 |
| DE | 102 52 728 A1 | 2/2004 |
| DE | 698 13 482 T2 | 2/2004 |
| DE | 10 2010 040 573 A1 | 3/2012 |
| DE | 11 2011 105 331 T5 | 3/2014 |
| JP | 2008-221995 A | 9/2008 |

* cited by examiner

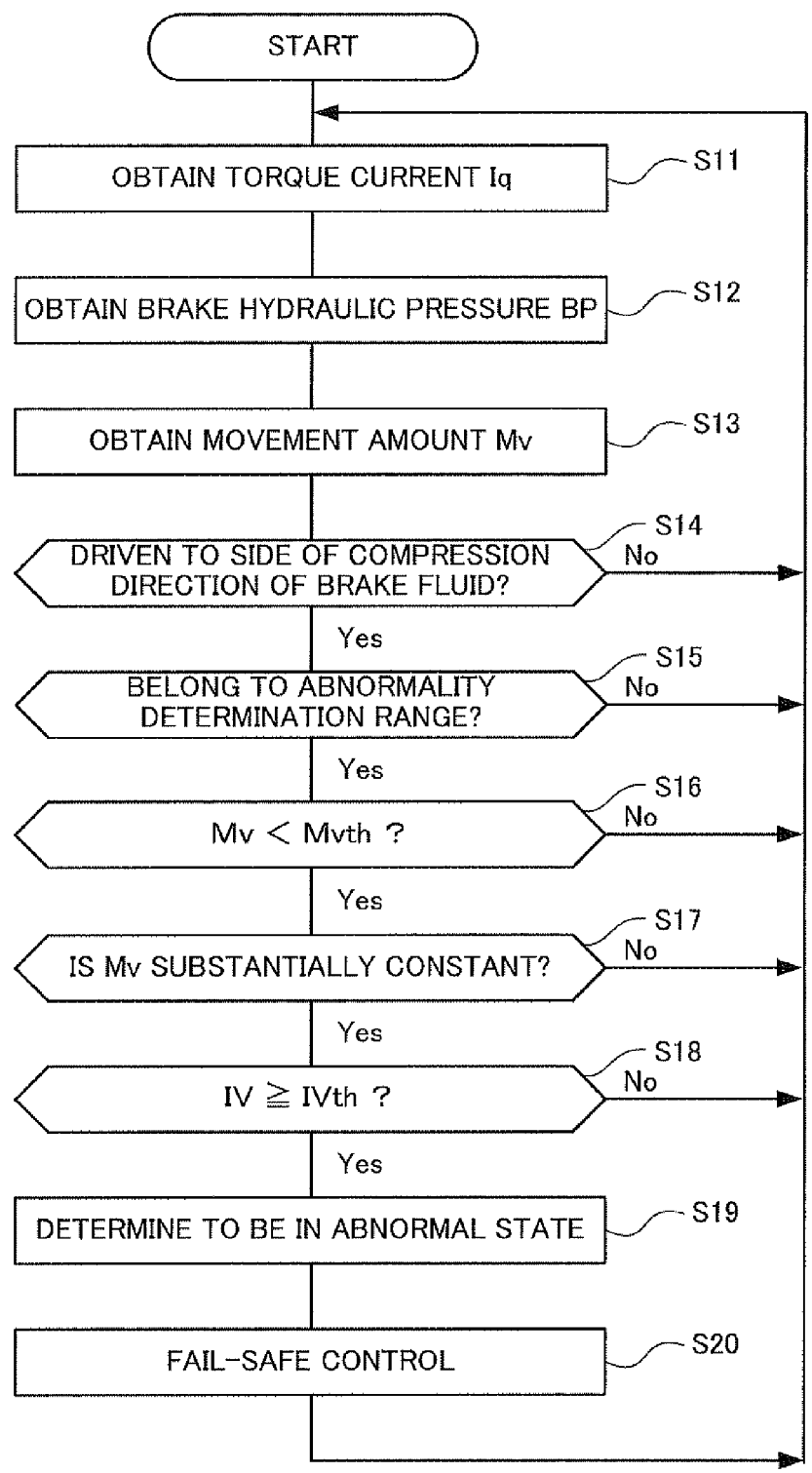

VEHICLE BRAKING FORCE GENERATOR

CROSS REFERENCE TO RELATED APPLICATIONS

This application claims the foreign priority benefit under Title 35, United States Code, 119 (a)-(d) of Japanese Patent Application No. 2012-161019, filed on Jul. 19, 2012 in the Japan Patent Office, the disclosure of which is herein incorporated by reference in its entirety.

TECHNICAL FIELD

The present invention relates to a vehicle braking force generator that generates a braking force to a vehicle.

BACKGROUND ART

For example, a by-wire type brake system that generates a braking force via an electrical circuit is employed in a hybrid vehicle, in addition to a conventional brake system that generates the braking force via a hydraulic circuit. Such a by-wire type brake system converts an operation amount of a brake pedal by a driver to an electrical signal, and transmits the signal to an electric motor that drives a piston of a slave cylinder. Then, a brake hydraulic pressure boosted by a driving of the piston by the electric motor is generated in the slave cylinder, and the generated brake hydraulic pressure operates wheel cylinders to generate the braking force (for example, see Patent Document 1).

In the by-wire type brake system according to Patent Document 1, if the slave cylinder fails while the wheel cylinders are operated by the brake hydraulic pressure generated by the slave cylinder during normal operation, the brake hydraulic pressure in the wheel cylinders is maintained by closing for a predetermined time an opening and closing valve disposed on a fluid passage connecting the slave cylinder to the wheel cylinders.

According to a fail-safe technology according to the Patent Document 1, it is possible to sufficiently raise the brake hydraulic pressure which is generated by a master cylinder for backup during the predetermined time. Therefore, it is possible to prevent the brake hydraulic pressure in the wheel cylinders from decreasing suddenly, when a braking by the slave cylinder is switched to the braking by the master cylinder.

CITATION LIST

Patent Literature

{Patent Document 1}
Japanese Patent Application Publication No. 2008-221995

SUMMARY OF INVENTION

Technical Problem

Incidentally, in the by-wire type brake system according to Patent Document 1, the driving of the piston by the electric motor is performed through a power transmission mechanism including a speed reducing gear. In such a power transmission mechanism, if a biting of a foreign matter into the speed reducing gear occurs, it becomes impossible to transmit a driving force by the electric motor to the piston. As a result, it becomes impossible to operate properly the by-wire type brake system.

In this regard, in the fail-safe technology according to the Patent Document 1, it is not mentioned to detect a failure state of the slave cylinder, especially to detect a sticking in the power transmission system including the biting of the foreign matter into the speed reducing gear.

The present invention has been made in view of the circumstances described above, and an object of the present invention is to provide a vehicle braking force generator capable of detecting the sticking in the power transmission system including the biting of the foreign matter into the speed reducing gear.

Solution to Problem

To achieve the above object, a first aspect of the present invention has the most important characteristics in which a vehicle braking force generator includes an electric hydraulic pressure generation unit that has a cylinder, a piston, and an electric motor which drives the piston via a power transmission mechanism including a speed reducing gear, and when the electric motor is driven according to an operation amount of a braking operation member, by receiving the driving force, the piston moves to a compression direction of a brake fluid with respect to the cylinder via the power transmission mechanism, thereby generating a brake hydraulic pressure corresponding to the operation amount of the brake operation member, a motor current obtaining unit that obtains a motor current according to the electric motor, a brake hydraulic pressure obtaining unit that obtains a brake hydraulic pressure generated in the cylinder, a movement amount obtaining unit that obtains a movement amount of the piston to the compression direction of the brake fluid with respect to the cylinder, and a determination unit that determines an operation state of the electric hydraulic pressure generation unit, wherein when the electric motor is driven according to the operation amount of the braking operation member, the determination unit determines that the electric hydraulic pressure generation unit is in abnormal state if a relationship between the motor current and the brake hydraulic pressure belongs to an abnormality determination range which deviates from a normality determination range having a predetermined width with a positive correlation, and the movement amount is less than a predetermined movement amount threshold value.

In the first aspect of the present invention, when the electric motor is driven according to the operation amount of the braking operation member, the determination unit determines that the electric hydraulic pressure generation unit is in abnormal state if the relationship between the motor current and the brake hydraulic pressure belongs to the abnormality determination range which deviates from the normality determination range having the predetermined width with the positive correlation, and the movement amount is less than the predetermined movement amount threshold value which is appropriately set in advance by considering a determination of a leak abnormality.

In the first aspect of the present invention, if the relationship between the motor current and the brake hydraulic pressure belongs to the abnormality determination range, for example, there is a high probability that causes a brake fluid leak (which may hereinafter referred to as a leak abnormality) or the sticking in the power transmission system including the biting of the foreign matter into the speed reducing gear (which may hereinafter referred to as a lock failure). Further, if the movement amount is less than the movement amount threshold value, there is a high probability that a hydraulic circuit operates properly and does not fall into a leak abnormality.

According to the first aspect of the present invention, it is possible to detect the lock failure quickly.

A second aspect of the present invention has the most important characteristics in which a vehicle braking force generator includes an electric hydraulic pressure generation unit that has a cylinder, a piston, and an electric motor which drives the piston via a power transmission mechanism including a speed reducing gear, and when the electric motor is driven according to an operation amount of a braking operation member, by receiving the driving force, the piston moves to a compression direction of a brake fluid with respect to the cylinder via the power transmission mechanism, thereby generating a brake hydraulic pressure corresponding to the operation amount of the brake operation member, a motor current obtaining unit that obtains a motor current according to the electric motor, a movement amount obtaining unit that obtains a movement amount of the piston to the compression direction of the brake fluid with respect to the cylinder, and a determination unit that determines an operation state of the electric hydraulic pressure generation unit, wherein when the electric motor is driven according to the operation amount of the braking operation member, the determination unit determines that the electric hydraulic pressure generation unit is in abnormal state if a time variation amount of the motor current is equal to or more than a predetermined variation amount threshold value, and the movement amount is substantially constant.

In the second aspect of the present invention, when the electric motor is driven according to the operation amount of the braking operation member, the determination unit determines that the electric hydraulic pressure generation unit is in abnormal state if the time variation amount of the motor current is equal to or more than the predetermined variation amount threshold value, and the movement amount is substantially constant.

In the second aspect of the present invention, when the electric motor is driven according to the operation amount of the braking operation member, if the time variation amount of the motor current is equal to or more than the predetermined variation amount threshold value, there is a high probability that the power transmission system has fallen into the lock failure. Because it is a typical symptom of the lock failure, for example, that the time variation amount of the motor current is equal to or more than the predetermined variation amount threshold value when the electric motor is driven as described above.

Further, in the second aspect of the present invention, when the electric motor is driven according to the operation amount of the braking operation member, if the movement amount is substantially constant, there is a high probability that the power transmission system has fallen into the lock failure. Because it is a typical symptom of the lock failure, for example, that the movement amount is substantially constant regardless of an increase of the motor current.

Therefore, according to the second aspect of the present invention, it is possible to detect the lock failure more appropriately. As a result, it is possible to improve significantly the reliability of the by-wire type brake system.

Further, a third aspect of the present invention has the most important characteristics in which a vehicle braking force generator includes an electric hydraulic pressure generation unit that has a cylinder, a piston, and an electric motor which drives the piston via a power transmission mechanism including a speed reducing gear, and when the electric motor is driven according to an operation amount of a braking operation member, by receiving the driving force, the piston moves to a compression direction of a brake fluid with respect to the cylinder via the power transmission mechanism, thereby generating a brake hydraulic pressure corresponding to the operation amount of the brake operation member, a motor current obtaining unit that obtains a motor current according to the electric motor, a movement amount obtaining unit that obtains a movement amount of the piston to the compression direction of the brake fluid with respect to the cylinder, and a determination unit that determines an operation state of the electric hydraulic pressure generation unit, wherein when the electric motor is driven according to the operation amount of the braking operation member, the determination unit determines that the electric hydraulic pressure generation unit is in abnormal state if a time variation amount of the motor current is equal to or more than a predetermined variation amount threshold value, and the movement amount is equal to or more than a predetermined movement amount threshold value and substantially constant.

In the third aspect of the present invention, when the electric motor is driven according to the operation amount of the braking operation member, the determination unit determines that the electric hydraulic pressure generation unit is in abnormal state if the time variation amount of the motor current is equal to or more than the predetermined variation amount threshold value, and the movement amount is equal to or more than the predetermined movement amount threshold value and substantially constant.

In the third aspect of the present invention, when the electric motor is driven according to the operation amount of the braking operation member, if the time variation amount of the motor current is equal to or more than the variation amount threshold value, there is a high probability that the power transmission system has fallen into the lock failure. Because it is a typical symptom of the lock failure, for example, that the time variation amount of the motor current is equal to or more than the predetermined variation amount threshold value when the electric motor is driven as described above.

Further, in the third aspect of the present invention, when the electric motor is driven according to the operation amount of the braking operation member, if the movement amount is not less than the predetermined movement amount threshold value and substantially constant, there is a high probability that the power transmission system has fallen into the lock failure similarly to the above. Because it is a typical symptom of the lock failure, for example, that the movement amount is not less than the movement amount threshold value and substantially constant in spite of the increase of the motor current.

Therefore, according to the third aspect of the present invention, it is possible to detect the lock failure more appropriately. As a result, it is possible to improve significantly the reliability of the by-wire type brake system.

A fourth aspect of the present invention is according to the first aspect of the present invention, and characterized in that the determination unit determines the electric hydraulic pressure generation unit is in abnormal state if the movement amount is substantially constant.

In the first aspect of the present invention, if the movement amount is substantially constant, there is a high probability that the power transmission system has fallen into the lock failure. Because it is a typical symptom of the lock failure, for example, that the movement amount is substantially constant in spite of the increase of the motor current. Therefore, according to the fourth aspect of the present invention, it is possible to detect the lock failure quickly and appropriately.

A fifth aspect of the present invention is according to the first aspect of the present invention, and characterized in that when the electric motor is driven according to the operation amount of the braking operation member, the determination unit determines the electric hydraulic pressure generation unit is in abnormal state if a time variation amount of the motor current is equal to or more than the predetermined variation amount threshold value.

In the first aspect of the present invention, when the electric motor is driven according to the operation amount of the braking operation member, if the time variation amount of the motor current is equal to or more than the predetermined variation amount threshold value, there is a high probability that the power transmission system has fallen into the lock failure. Because it is a typical symptom of the lock failure, for example, that the time variation amount of the motor current is equal to or more than the predetermined variation amount threshold value when the electric motor is driven as described above.

Therefore, according to the fifth aspect of the present invention, it is possible to detect the lock failure quickly and appropriately.

Further, a sixth aspect of the present invention is according to the first aspect of the present invention, and characterized in that the abnormality determination range is a range in which the brake hydraulic pressure is less than a predetermined hydraulic pressure threshold value.

In the first aspect of the present invention, when the electric motor is driven according to the operation amount of the braking operation member, if the relationship between the motor current and the brake hydraulic pressure belongs to the abnormality determination range and the movement amount is less than the predetermined movement amount threshold value, the determination unit determines that the electric hydraulic pressure generation unit is in abnormal state.

Therefore, according to the sixth aspect of the present invention, it is possible to detect the lock failure and the leak abnormality quickly and appropriately.

Advantageous Effects of Invention

According to a vehicle braking force generator of the present invention, it is possible to detect a sticking in the power transmission system including the biting of the foreign matter into the speed reducing gear.

BRIEF DESCRIPTION OF DRAWINGS

FIG. 4 is a flowchart showing a flow of an operation state determination process performed by the vehicle braking force generator according to the embodiment of the present invention.

DESCRIPTION OF EMBODIMENTS

Figure 1:
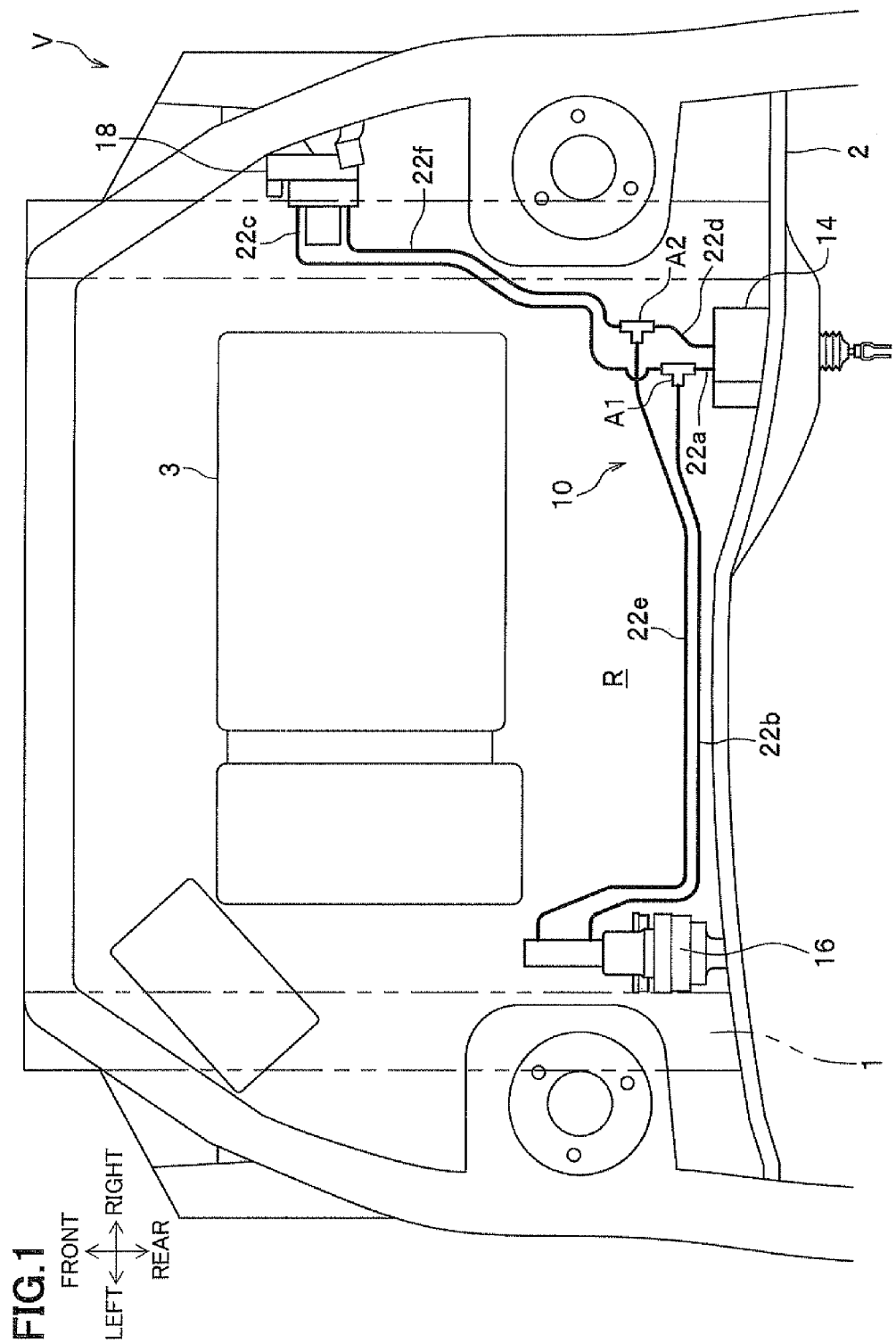
FIG. 1 is a diagram illustrating an example of a vehicle equipped with a vehicle braking force generator according to an embodiment of the present invention.

Hereinafter, a vehicle braking force generator according to an embodiment of the present invention will be described in detail with reference to accompanying drawings. Note that, in the following drawings, members having the same function or members having the function corresponding to one another are denoted by the same reference numerals in principle. In addition, for convenience of description, the size and shape of the members may be illustrated schematically by exaggerated or deformed.

[Example of a Vehicle V Equipped with a Vehicle Braking Force Generator 10 According to the Embodiment of the Present Invention]

First, an example of a vehicle V equipped with a vehicle braking force generator 10 according to the embodiment of the present invention will be described with reference to FIG. 1. FIG. 1 is a diagram illustrating the example of the vehicle equipped with the vehicle braking force generator according to the embodiment of the present invention. In addition, directions of front, rear, left, and right of the vehicle V are illustrated by arrows in FIG. 1.

The vehicle braking force generator 10 according to the embodiment of the present invention includes a by-wire type brake system that generates a braking force via an electrical circuit in addition to a conventional brake system that generates the braking force via a hydraulic circuit.

As shown in FIG. 1, the vehicle braking force generator is configured to include a vehicle hydraulic pressure generator (hereinafter, may be referred to as "hydraulic pressure generator") 14 in which a braking operation by a driver is inputted via a brake pedal (corresponds to a "braking operation member" of the present invention) 12, a motor cylinder device 16 that generates a brake hydraulic pressure based on at least an electrical signal according to the braking operation, and a vehicle stability assist device 18 (hereinafter, referred to as "VSA device 18", however, VSA is a registered trademark) that supports a stabilization of a behavior of the vehicle based on the brake hydraulic pressure generated by the motor cylinder device 16.

In an example shown in FIG. 1, the hydraulic pressure generator 14 is applied to a right-hand drive, and secured to the right side of the vehicle width direction of a dashboard 2 by bolts or the like. However, the hydraulic pressure generator 14 may be one that is applied to a left-hand drive.

In the example shown in FIG. 1, the motor cylinder device 16 is disposed on the left side in the vehicle width direction opposite to the hydraulic pressure generator 14, and mounted on a vehicle body 1 such as a left side frame or the like by mounting brackets (not shown).

In the example shown in FIG. 1, the VSA device 18 is mounted on the right front end portion in the vehicle body 1 by mounting brackets (not shown). The VSA device 18 is configured to include an ABS (Antilock Brake System) function for preventing a wheel lock during the braking operation, a TCS (Traction Control System) function for preventing a wheel slip during acceleration, a function for suppressing a skid during turning, and the like. It is also possible to connect an ABS device having an ABS function in place of the VSA device 18.

In the example shown in FIG. 1, the hydraulic pressure generator 14, the motor cylinder device 16, and the VSA device 18 are separated from each other through piping tubes 22a to 22f, and disposed in a structure mounting chamber R in which structures 3 such as an engine, a traction motor, and the like provided in front of the dashboard 2 of the vehicle V are mounted. Detailed internal structures of the hydraulic pressure generator 14, the motor cylinder device 16, and the VSA device 18 will be described later.

The vehicle braking force generator 10 is applicable to any of a front-wheel-drive vehicle, a rear-wheel-drive vehicle, and a four-wheel-drive vehicle. In addition, the hydraulic pressure generator 14 and the motor cylinder device 16 as the by-wire type brake system are electrically connected to an ECU (Electronic Control Unit) 307 (see FIG. 3A) described later via electric wires not illustrated.

[Overview of the Vehicle Braking Force Generator 10 According to the Embodiment of the Present Invention]

Figure 2A:
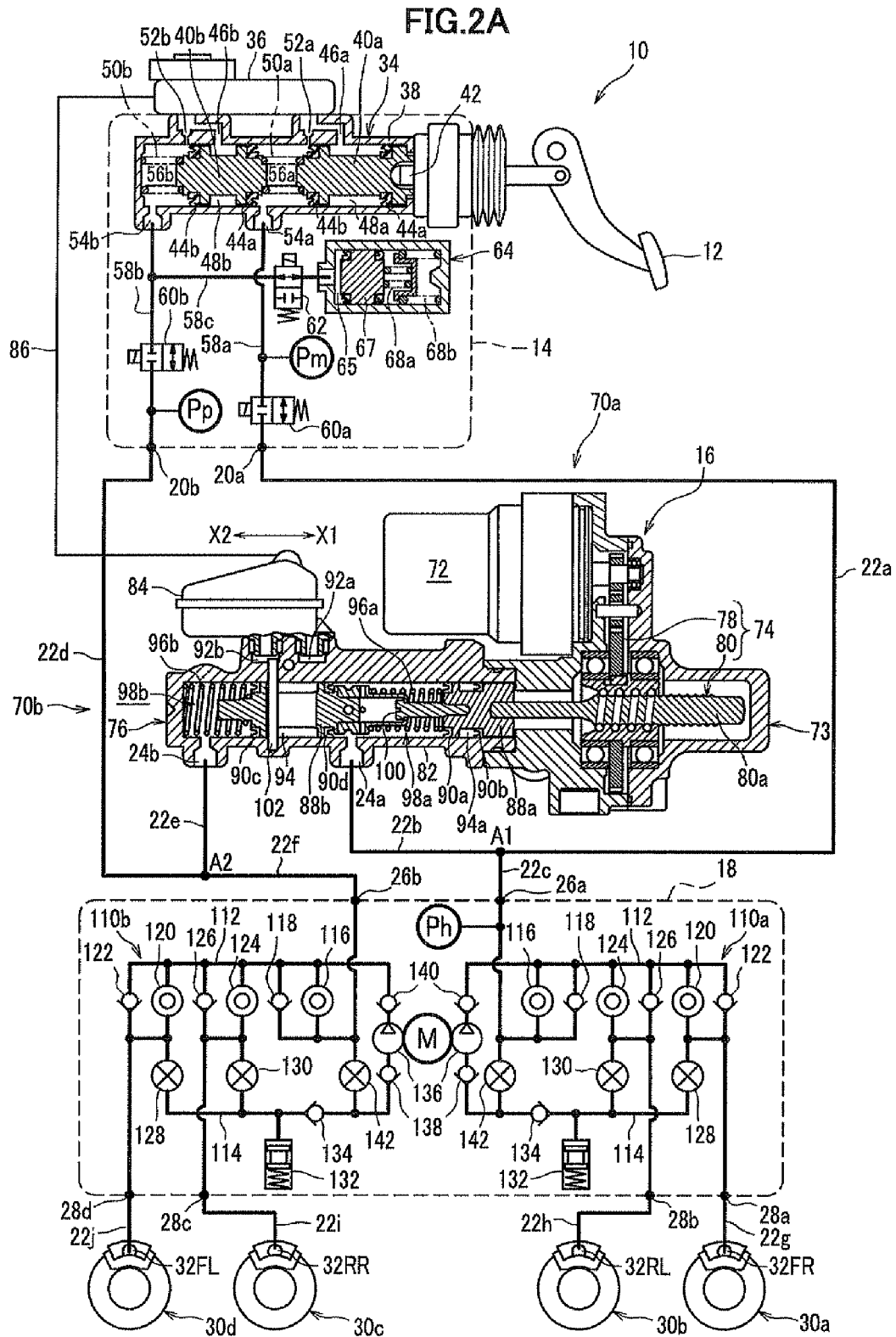
FIG. 2A is a block diagram showing an overview of the vehicle braking force generator according to the embodiment of the present invention.

FIG. 2A is a block diagram showing an overview of the vehicle braking force generator 10 according to the embodiment of the present invention. First, a configuration of hydraulic passages will be described. With reference to a connection point A1 in FIG. 2A, the connection point A1 and a connection port 20a of the hydraulic pressure generator 14 are connected via a first piping tube 22a. Further, the connection point A1 and an output port 24a of the motor cylinder device 16 are connected via a second piping tube 22b. Furthermore, the connection point A1 and an introduction port 26a of the VSA device 18 are connected via a third piping tube 22c.

With reference to the other connection point A2 in FIG. 2A, the connection point A2 and the other connection port 20b of the hydraulic pressure generator 14 are connected via a fourth piping tube 22d. Further, the connection point A2 and the other output port 24b of the motor cylinder device 16 are connected via a fifth piping tube 22e. Furthermore, the connection point A2 and the other introduction port 26b of the VSA device 18 are connected via a sixth piping tube 22f.

The VSA device 18 includes a plurality of outlet ports 28a to 28d. The first outlet port 28a is connected to a wheel cylinder 32FR of a disk brake mechanism 30a provided on a front right wheel via a seventh piping tube 22g. The second outlet port 28b is connected to a wheel cylinder 32RL of a disk brake mechanism 30b provided on a rear left wheel via an eighth piping tube 22h. The third outlet port 28c is connected to a wheel cylinder 32RR of a disk brake mechanism 30c provided on a rear right wheel via a ninth piping tube 22i. The fourth outlet port 28d is connected to a wheel cylinder 32FL of a disk brake mechanism 30d provided on a front left wheel via a tenth piping tube 22j.

In this case, the brake fluid is supplied to each of the wheel cylinders 32FR, 32RL, 32RR, 32FL of the disk brake mechanisms 30a to 30d via each of the piping tubes 22g to 22j connected to each of the outlet ports 28a to 28d, and the hydraulic pressure in each of the wheel cylinders 32FR, 32RL, 32RR, 32FL is raised, and thereby each of the wheel cylinders 32FR, 32RL, 32RR, 32FL operates to apply the braking force to the corresponding wheels (front right wheel, rear left wheel, rear right wheel, front left wheel).

Incidentally, the vehicle braking force generator 10 may be applied to, for example, various vehicles including an automobile driven by only a reciprocated engine (internal combustion engine), a hybrid vehicle, an electric vehicle, a fuel cell vehicle, and the like.

The hydraulic pressure generator 14 includes a tandem master cylinder 34 for generating the hydraulic pressure according to an operation amount of a brake pedal 12 by the driver, and a first reservoir 36 attached to the master cylinder 34. In a cylinder unit 38 of the master cylinder 34, a first piston 40a and a second piston 40b are provided slidably in a state in which they are separated by a predetermined distance in the axial direction of the cylinder unit 38. The first piston 40a is disposed in proximity to the side of the brake pedal 12, and connected to the brake pedal 12 via a pushrod 42. In addition, the second piston 40b is disposed apart from the brake pedal 12 compared to the first piston 40a.

The outer peripheral surfaces of the first piston 40a and the second piston 40b are respectively provided with a pair of piston packings 44a, 44b. Between the pair of piston packings 44a, 44b, back chambers 48a, 48b respectively communicating with supply ports 46a, 46b described later are formed. Between the first piston 40a and the second piston 40b, a first spring member 50a connecting the first piston 40a and the second piston 40b is provided. Between the second piston 40b and an inner wall of the cylinder unit 38, a second spring member 50b connecting the second piston 40b and the inner wall of the cylinder unit 38 is provided.

The cylinder unit 38 of the master cylinder 34 is provided with the two supply ports 46a, 46b, two relief ports 52a, 52b, and two output ports 54a, 54b, respectively. Each of the supply ports 46a, 46b and each of the relief ports 52a, 52b are adapted to join together and communicate with a non-illustrated reservoir chamber in the first reservoir 36, respectively.

In addition, in the cylinder unit 38 of the master cylinder 34, there are respectively provided a first hydraulic chamber 56a and a second hydraulic chamber 56b which generate the brake hydraulic pressure according to a depression force of the brake pedal 12 by the driver. The first hydraulic chamber 56a is adapted to communicate with the connection port 20a via a first hydraulic pressure passage 58a. The second hydraulic chamber 56b is adapted to communicate with the connection port 20b via a second hydraulic pressure passage 58b.

Between the master cylinder 34 and the connection port 20a, on the upstream side of the first hydraulic pressure passage 58a, a pressure sensor Pm is provided. Further, on the downstream side of the first hydraulic pressure passage 58a, is provided a first shutoff valve 60a composed of a normally open type solenoid valve. On the first hydraulic pressure passage 58a, the pressure sensor Pm has a function of detecting a hydraulic pressure on the upstream side (master cylinder 34 side) relative to the first shutoff valve 60a.

Between the master cylinder 34 and the other connection port 20b, on the upstream side of the second hydraulic pressure passage 58b, is provided a second shutoff valve 60b composed of the normally open type solenoid valve. Further, on the downstream side of the second hydraulic pressure passage 58b, a pressure sensor Pp is provided. On the second hydraulic pressure passage 58b, the pressure sensor Pp has a function of detecting a brake hydraulic pressure on the downstream side (the side of wheel cylinders 32FR, 32RL, 32RR, and 32FL) relative to the second shutoff valve 60b.

"Normally open" of the first shutoff valve 60a and the second shutoff valve 60b means a valve configured such that a normal position (position of a valve element when degaussed (de-energized)) is a state of open position (always open). Note that, in FIG. 2A, the first shutoff valve 60a and the second shutoff valve 60b are in energized states (a third shutoff valve 62 described later as well).

On the second hydraulic pressure passage 58b between the master cylinder 34 and the second shutoff valve 60b, is provided a branch hydraulic pressure passage 58c branching from the second hydraulic pressure passage 58b. To the branch hydraulic pressure passage 58c, a stroke simulator 64 and a third shutoff valve 62 composed of a normally closed type solenoid valve are connected in series. "Normally closed" of the third shutoff valve 62 means a valve configured such that a normal position (position of a valve element when degaussed (de-energized)) is a state of closed position (always closed).

Next, an overview of the stroke simulator 64 will be described with reference to FIG. 2A. As shown in FIG. 2A, the stroke simulator 64 is disposed on the second hydraulic pressure passage 58b and on the master cylinder 34 side relative to the second shutoff valve 60b. The stroke simulator 64 includes a reaction force hydraulic pressure chamber 65 communicating with the branch hydraulic pressure passage 58c. To the reaction force hydraulic pressure chamber 65, the brake hydraulic pressure generated in the second hydraulic pressure chamber 56b of the master cylinder 34 is adapted to be applied. The stroke simulator 64 includes a simulator piston 67, a first return spring 68a, and a second return spring 68b in a housing thereof.

Here, the configuration of the hydraulic pressure passages will be described. The hydraulic pressure passages are roughly separated into a first hydraulic pressure system 70a connecting the first hydraulic pressure chamber 56a of the master cylinder 34 and the plurality of wheel cylinders 32FR, 32RL, and a second hydraulic pressure system 70b connecting the second hydraulic pressure chamber 56b of the master cylinder 34 and the plurality of wheel cylinders 32RR, 32FL.

The first hydraulic pressure system 70a includes the first hydraulic pressure passage 58a connecting the connection port 20a and the output port 54a of the master cylinder 34 (cylinder unit 38) in the hydraulic pressure generator 14, the first and second piping tubes 22a, 22b connecting the connection port 20a of the hydraulic pressure generator 14 and the output port 24a of the motor cylinder device 16, the second and third piping tubes 22b, 22c connecting the output port 24a of the motor cylinder device 16 and the introduction port 26a of the VSA device 18, and the seventh and eighth piping tubes 22g, 22h respectively connecting the first and second outlet ports 28a, 28b of the VSA 18 and the wheel cylinders 32FR, 32RL.

The second hydraulic pressure system 70b includes the second hydraulic pressure passage 58b connecting the other connection port 20b and the output port 54b of the master cylinder 34 (cylinder unit 38) in the hydraulic pressure generator 14, the fourth and fifth piping tubes 22d, 22e connecting the other connection port 20b of the hydraulic pressure generator 14 and the output port 24b of the motor cylinder device 16, the fifth and sixth piping tubes 22e, 22f connecting the output port 24b of the motor cylinder device 16 and the introduction port 26b of the VSA device 18, and the ninth and tenth piping tubes 22i, 22j respectively connecting the third and fourth outlet ports 28c, 28d of the VSA 18 and the wheel cylinders 32RR, 32FL.

[Configuration of the VSA Device 18]

Next, the VSA 18 will be described with reference to FIG. 2A. Devices of configuration known in the art can be appropriately adopted as the VSA device 18. Specifically, as the VSA device 18, for example, a device including a first brake system 110a for controlling the first hydraulic pressure system 70a connected to the disk brake mechanisms 30a, 30b (wheel cylinders 32FR, 32RL) of the front right wheel and the rear left wheel, and a second brake system 110b for controlling the second hydraulic pressure system 70b connected to the disk brake mechanisms 30c, 30d (wheel cylinders 32RR, 32FL) of the rear right wheel and the front left wheel can be used.

Since the first brake system 110a and the second brake system 110b have the same structures with each other, the same reference numerals are given to those corresponding to each other in the first brake system 110a and in the second brake system 110b, and descriptions will be focused on the first brake system 110a and descriptions of the second brake system 110b will be appropriately appended in parentheses.

The first brake system 110a (the second brake system 110b) includes a first common hydraulic pressure passage 112 and a second common hydraulic pressure passage 114, which are common to the wheel cylinders 32FR, 32RL (32RR, 32FL). The VSA device 18 includes a regulator valve 116, a first check valve 118, a first inlet valve 120, a second check valve 122, a second inlet valve 124, and a third check valve 126. The regulator valve 116 is composed of a normally open type solenoid valve disposed between the introduction port 26a and the first common hydraulic pressure passage 112. The first check valve 118 is disposed in parallel with the regulator valve 116, and allows the brake fluid to flow from the side of the introduction port 26a to the side of the first common hydraulic pressure passage 112 (prevents the brake fluid from flowing to the side of the introduction port 26a from the side of the first common hydraulic pressure passage 112). The first inlet valve 120 is composed of a normally open type solenoid valve disposed between the first common hydraulic pressure passage 112 and the first output port 28a. The second check valve 122 is disposed in parallel with the first inlet valve 120, and allows the brake fluid to flow from the side of the first output port 28a to the side of the first common hydraulic pressure passage 112 (prevents the brake fluid from flowing to the side of the first output port 28a from the side of the first common hydraulic pressure passage 112). The second inlet valve 124 is composed of a normally open type solenoid valve disposed between the first common hydraulic pressure passage 112 and the second output port 28b. The third check valve 126 is disposed in parallel with the second inlet valve 124, and allows the brake fluid to flow from the side of the second output port 28b to the side of the first common hydraulic pressure passage 112 (prevents the brake fluid from flowing to the side of the second output port 28b from the side of the first common hydraulic pressure passage 112).

Further, the VSA 18 includes a first outlet valve 128, a second outlet valve 130, a reservoir 132, a fourth check valve 134, a pump 136, an intake valve 138, a discharge valve 140, a motor M, and a suction valve 142. The first outlet valve 128 is composed of a normally closed type solenoid valve disposed between the first output port 28a and the second common hydraulic pressure passage 114. The second outlet valve 130 is composed of a normally closed type solenoid valve disposed between the second output port 28b and the second common hydraulic pressure passage 114. The reservoir 132 is connected to the second common hydraulic pressure passage 114. The fourth check valve 134 is disposed between the first common hydraulic pressure passage 112 and the second common hydraulic pressure passage 114, and allows the brake fluid to flow from the side of the second common hydraulic pressure passage 114 to the side of the first common hydraulic pressure passage 112 (prevents the brake fluid from flowing to the side of the second common hydraulic pressure passage 114 from the side of the first common hydraulic pressure passage 112). The pump 136 is disposed between the fourth check valve 134 and the first common hydraulic pressure passage 112, and supplies the brake fluid from the side of the second common hydraulic pressure passage 114 to the side of the first common hydraulic pressure passage 112. The intake valve 138 and the discharge valve 140 are disposed respectively before and after the pump 136 driven by the motor M. The suction valve 142 is composed of a normally closed type solenoid valve disposed between the second common hydraulic pressure passage 114 and the introduction port 26a.

In the first brake system 110a, on the hydraulic pressure passage in proximity to the introduction port 26a, is disposed a pressure sensor Ph for detecting the brake hydraulic pressure which is generated in the first hydraulic pressure chamber 98a of the motor cylinder device 16 and outputted from the output port 24a of the motor cylinder device 16. Information according to the brake hydraulic pressure detected by each of the pressure sensors Pm, Pp, and Ph (see FIG. 3A) is transmitted to an ECU 307 (see FIG. 3A).

[Configuration of the Motor Cylinder Device 16]

Figure 2B:
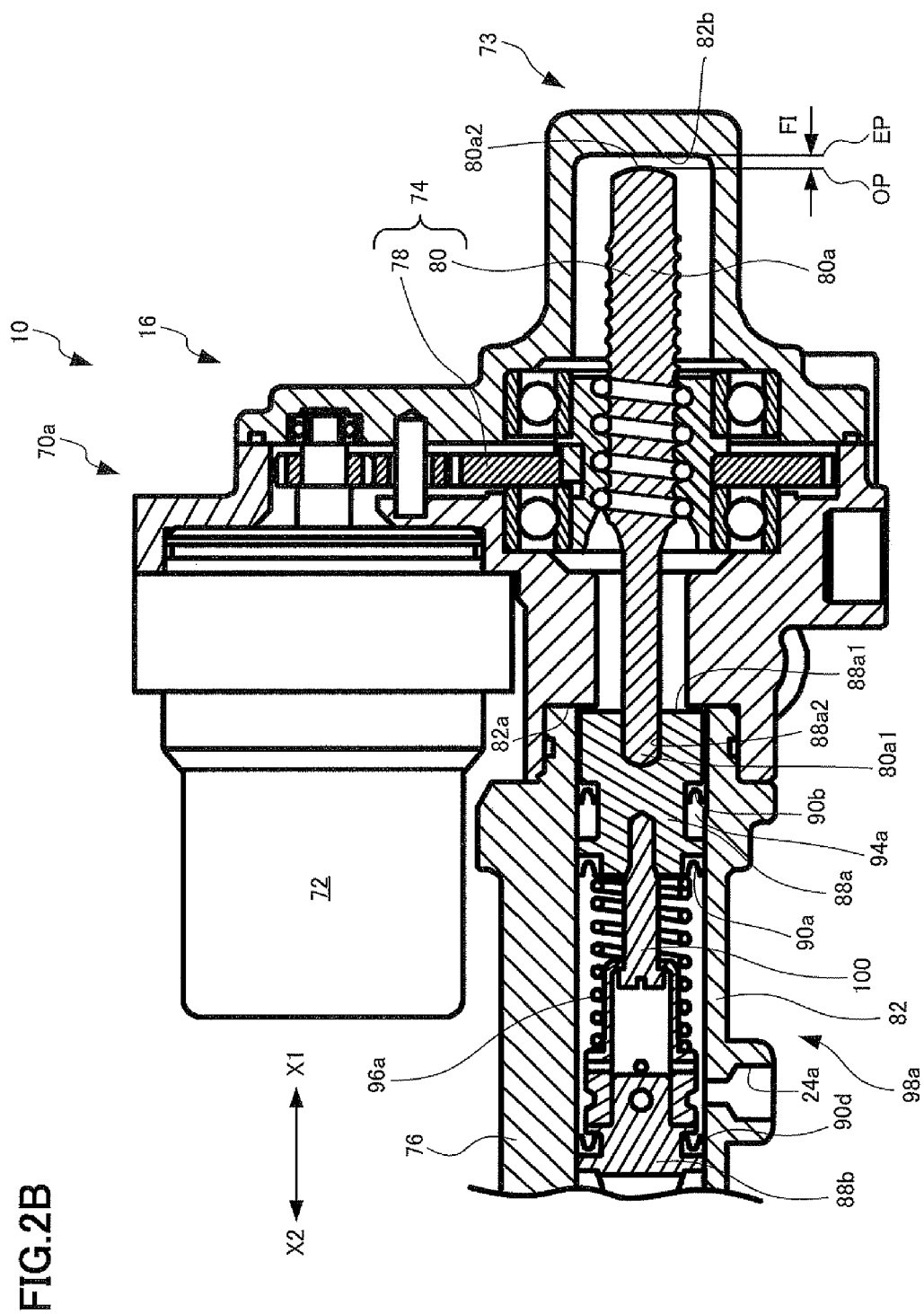
FIG. 2B is an explanatory diagram showing an enlarged structure around an electric motor in a motor cylinder device.
Figure 2C:
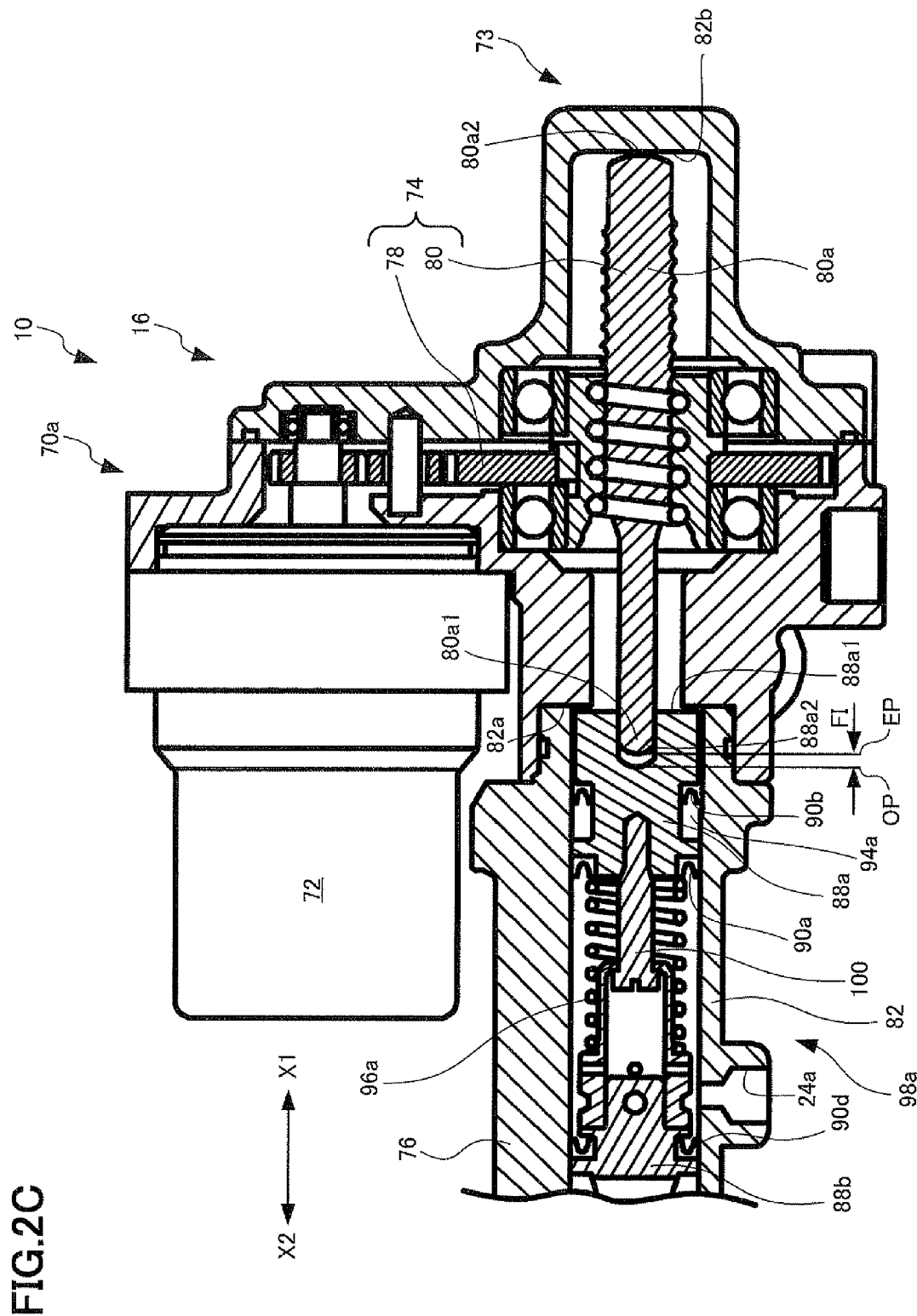
FIG. 2C is an explanatory diagram showing an enlarged structure around an electric motor in the motor cylinder device.

Next, the configuration of the motor cylinder device 16, which plays an important role in the embodiment of the present invention, will be described with reference to FIGS. 2B and 2C in addition to FIG. 2A. FIGS. 2B and 2C are explanatory diagrams showing an enlarged structure around an electric motor 72 in the motor cylinder device 16. Among them, FIG. 2B shows a state in which a ball screw shaft unit 80a is positioned at an origin position OP. On the other hand, FIG. 2C shows a state in which the ball screw shaft unit 80a is positioned at an end position EP.

As shown in FIG. 2A, the motor cylinder device 16 corresponding to an "electric hydraulic pressure generation unit" of the present invention drives a first slave piston 88a and a second slave piston 88b to the axial direction by a rotational driving force of the electric motor 72, thereby having a function to generate the brake hydraulic pressure.

Incidentally, in the motor cylinder device 16, among the moving directions of the first slave piston 88a and the second slave piston 88b, X1 direction shown by an arrow in FIG. 2A is defined as a forward direction (compression direction of the brake fluid), and X2 direction opposite to the forward direction (compression direction of the brake fluid) shown by an arrow in FIG. 2A is defined as a backward direction.

As shown in FIG. 2A, the motor cylinder device 16 includes a cylinder unit 76, the electric motor 72, and a driving force transmission unit 73 for transmitting the driving force of the electric motor 72 to the first slave piston 88a and the second slave piston 88b. The cylinder unit 76 corresponds to a "cylinder" of the present invention. The first slave piston 88a and the second slave piston 88b correspond to "pistons" of the present invention.

The cylinder unit 76 includes a cylinder body 82 of substantially cylindrical shape, and a second reservoir 84 attached to the cylinder body 82. The second reservoir 84 is connected by a piping tube 86 to the first reservoir 36 attached to the master cylinder 34 of the hydraulic pressure generator 14, and configured to supply the brake fluid reserved in the first reservoir 36 into the second reservoir 84 via the piping tube 86.

In the cylinder body 82, the first slave piston 88a and the second slave piston 88b are provided in a state in which they are separated by a predetermined distance in the axial direction of the cylinder body 82, and slidably along the axial direction. The first slave piston 88a is disposed on the side of a ball screw structure 80, while the second slave piston 88b is disposed apart from the ball screw structure 80 side compared to the first slave piston 88a.

The electric motor 72 has a function of driving the first slave piston 88a and the second slave piston 88b via a power transmission mechanism 74 described next according to the operation amount (stroke amount) of the brake pedal 12 by the driver which is detected by a stroke sensor 305 (see FIG. 3A) described later. As the electric motor 72, for example, it is possible to employ a permanent magnet synchronous motor such as a brushless DC motor or an AC servo motor. In the following description, as the electric motor 72 used in the present embodiment, a three-phase AC motor energized by a permanent magnet of embedded structure (paramagnetic material having voids, with an embedded permanent magnet to the field) will be described as an example.

The electric motor 72 includes a rotor and a stator coil (not shown). In the electric motor 72, a rotating magnetic field is generated by three-phase AC current flowing through three-phase winding of the stator coil. By controlling the rotating magnetic field in accordance with a rotation angle of the rotor, the permanent magnet attached to the rotor is applied to the rotating magnetic field and a torque is adapted to be generated.

As shown in FIGS. 2B and 2C, the driving force transmission unit 73 has a deceleration mechanism 78 for transmitting the rotational driving force of the electric motor 72, and the power transmission mechanism 74 including the ball screw structure 80 which converts the rotational driving force of the electric motor 72 to a linear direction driving force along the axial direction of the ball screw shaft unit 80a.

In a state in which the brake pedal 12 is not operated by the driver, an end portion 88a1 of the backward direction in the first slave piston 88a receives a spring force of a first and second return springs 96a, 96b described later, and is positioned to be abutted against an annular step portion 82a formed in the cylinder body 82. In short, the first slave piston 88a is urged to the backward direction.

As shown in FIGS. 2B and 2C, the end portion 88a1 of the backward direction in the first slave piston 88a is provided with a substantially cylindrical bore portion 88a2. To this bore portion 88a2, a substantially cylindrical front end portion 80a1 of the ball screw shaft unit 80a is adapted to be accommodated.

Here, the ball screw shaft unit 80a is configured not to transmit a power to the first slave piston 88a between the origin position OP shown in FIG. 2B and the end position EP shown in FIG. 2C. As shown in FIGS. 2B and 2C, an interval between the origin position OP and the end position EP is referred to as a free running interval FI. Note that the end position EP shown in FIG. 2C means a position along the axial direction in a state in which a rear end portion 80a2 of the ball screw shaft unit 80a is abutted against a rear end portion 82b in the cylinder body 82.

The vehicle braking force generator 10 according to the embodiment of the present invention is operative to determine with high accuracy a rotation angle according to the electric motor 72 which is forcibly stopped at the end position EP, and by using the rotation angle update with high accuracy a rotation angle according to the electric motor 72 at the origin position OP, on the assumption that the ball screw shaft unit 80a has the free running interval FI and the rotation angle according to the electric motor 72 when the electric motor 72 is positioned at the origin position OP is set as a relative rotation angle with reference to the rotation angle according to the electric motor 72 corresponding to the end position EP.

On the outer peripheral surface of the front end side in the first slave piston 88a, a slave piston packing 90a is provided via an annular step portion. Further, on the outer peripheral surface in the middle between the front end side and the rear end side of the first slave piston 88a, a first back chamber 94a by an annular recess is formed. The first back chamber 94a is in communication with a reservoir port 92a described later. On the rear end side of the first back chamber 94a, a slave piston packing 90b is provided. The slave piston packing 90b has a function of sealing in a liquid-tight state between the first back chamber 94a and the power transmission mechanism 74.

Between the first slave piston 88a and the second slave piston 88b, a first return spring 96a is provided.

On the outer peripheral surface of the second slave piston 88b, a pair of slave piston packings 90c, 90d are provided via an annular step portion. Between the pair of slave piston packings 90c, 90d, a second back chamber 94b communicating with the reservoir port 92b described later is formed.

Between the second slave piston 88b and the front end portion of the cylinder body 82, a second return spring 96b is provided. In short, the second slave piston 88b is urged to the backward direction similarly to the first slave piston 88a.

The cylinder body 82 of the cylinder unit 76 is provided with the two reservoir ports 92a, 92b and the two output ports 24a, 24b, respectively. The reservoir ports 92a, 92b are adapted to communicate with a reservoir chamber in the second reservoir 84.

Further, in the cylinder body 82, the first hydraulic pressure chamber 98a for generating the brake hydraulic pressure to the wheel cylinders 32FR, 32RL sides from the output port 24a, and the second hydraulic pressure chamber 98b for generating the brake hydraulic pressure to the wheel cylinders 32RR, 32FL sides from the other output port 24b, are provided.

Between the first slave piston 88a and the second slave piston 88b, a regulation member 100 for regulating the maximum spacing interval and the minimum spacing interval between the first slave piston 88a and the second slave piston 88b is provided. Further, to the second slave piston 88b, a stopper pin 102 for regulating a sliding range of the second slave piston 88b and preventing an over-return to the first slave piston 88a side is provided. Thus, for example, in a backup time when braking with the brake hydraulic pressure generated in the master cylinder 34, even if a failure occurs in one system, the influence is supposed not to be exerted on the other system.

[Basic Operation of the Vehicle Braking Force Generator 10]

Next, a basic operation of the vehicle braking force generator 10 will be described. In a normal operation time of the vehicle braking force generator 10, regardless of whether or not the brake hydraulic pressure is generated in the master cylinder 34, the first shutoff valve 60a and the second shutoff valve 60b composed of the normally open type solenoid valve are in a closed valve state by energization, and the third shutoff valve 62 composed of the normally closed type solenoid valve is in an open valve state by energization (see FIG. 2A). Therefore, the brake hydraulic pressure generated by the master cylinder 34 of the hydraulic pressure generator 14 is not transmitted to the wheel cylinders 32FR, 32RL, 32RR, 32FL of the disk brake mechanisms 30a to 30d, because the first hydraulic system 70a and the second hydraulic system 70b are shut off by the first shutoff valve 60a and the second shutoff valve 60b. This is because an electric brake system by the motor cylinder device 16 described later actually operates in the normal operation time of the vehicle braking force generator 10.

In this case, when the brake hydraulic pressure is generated in the second hydraulic pressure chamber 56b of the master cylinder 34, the generated brake hydraulic pressure is transmitted to the hydraulic pressure chamber 65 of the stroke simulator 64 via the branch hydraulic pressure passage 58c and the third shutoff valve 62 in the open valve state. By the brake hydraulic pressure supplied to the reaction force hydraulic pressure chamber 65, the simulator piston 67 is displaced against the spring force of the return springs 68a, 68b, so that a stroke of the brake pedal 12 is allowed while a pseudo-pedal reaction force is generated to be fed back to the brake pedal 12. As a consequence, a brake operation feeling not uncomfortable for the driver is obtained.

In such a state of the brake system, when the ECU 307 (see FIG. 3A) detects the depression of the brake pedal 12 by the driver, the ECU 307 drives the electric motor 72 of the motor cylinder device 16 to transmit the driving force of the electric motor 72 via the power transmission mechanism 74, and displaces the first slave piston 88a and the second slave piston 88b toward the direction of the arrow X2 in FIG. 2A against the spring force of the first return spring 96a and the second return spring 96b.

By the displacement of the first slave piston 88a and the second slave piston 88b, the brake fluid in the first hydraulic pressure chamber 98a and the brake fluid in the second hydraulic pressure chamber 98b are pressurized to be balanced with each other, thereby generating an intended brake hydraulic pressure.

The brake fluid pressure in the first hydraulic pressure chamber 98a and the second hydraulic pressure chamber 98b of the motor cylinder device 16 are transmitted to the wheel cylinders 32FR, 32RL, 32RR, 32FL of the disk brake mechanisms 30a to 30d via the first and second inlet valves 120, 124 in the open valve state of the VSA device 18, and an intended brake force is applied to each of the wheels by the operations of the wheel cylinders 32FR, 32RL, 32RR, 32FL.

In short, in the vehicle braking force generator 10, in the normal operation time of the ECU 307 (see FIG. 3A) performing the control of the by-wire and the motor cylinder device 16, the so-called by-wire type brake system is activated when the driver depresses the brake pedal 12. Specifically, in the vehicle braking force generator 10 in the normal operation time, when the driver depresses the brake pedal 12, in the state in which the first shutoff valve 60a and the second shutoff valve 60b shut off the communication between the master cylinder 34 and the disk brake mechanisms 30a to 30d (wheel cylinders 32FR, 32RL, 32RR, 32FL) braking each of the wheels, the disk brake mechanisms 30a to 30d are operated by using the brake hydraulic pressure generated by the motor cylinder device 16. Therefore, the vehicle braking force generator 10 is suitably applied to, for example, a vehicle such as an electric vehicle (including a fuel cell vehicle) or a hybrid vehicle which has little or no negative pressure generated in a combustion engine, or a vehicle which has no combustion engine itself.

On the other hand, in the vehicle braking force generator 10, in an abnormal operation time in which the motor cylinder device 16 or the ECU 307 is inoperative, a conventional hydraulic pressure type brake system is activated when the driver depresses the brake pedal 12. Specifically, in the vehicle braking force generator 10 in the abnormal operation time, when the driver depresses the brake pedal 12, the first shutoff valve 60a and the second shutoff valve 60b become in the open valve state and the third shutoff valve 62 becomes in the closed valve state, and the brake hydraulic pressure generated in the master cylinder 34 is transmitted to the disk brake mechanisms 30a to 30d (wheel cylinders 32FR, 32RL, 32RR, 32FL) to operate the disk brake mechanisms 30a to 30d (wheel cylinders 32FR, 32RL, 32RR, 32FL).

[Configuration Around the ECU 307 Included in the Vehicle Braking Force Generator 10 According to the Embodiment of the Present Invention]

Figure 3A:
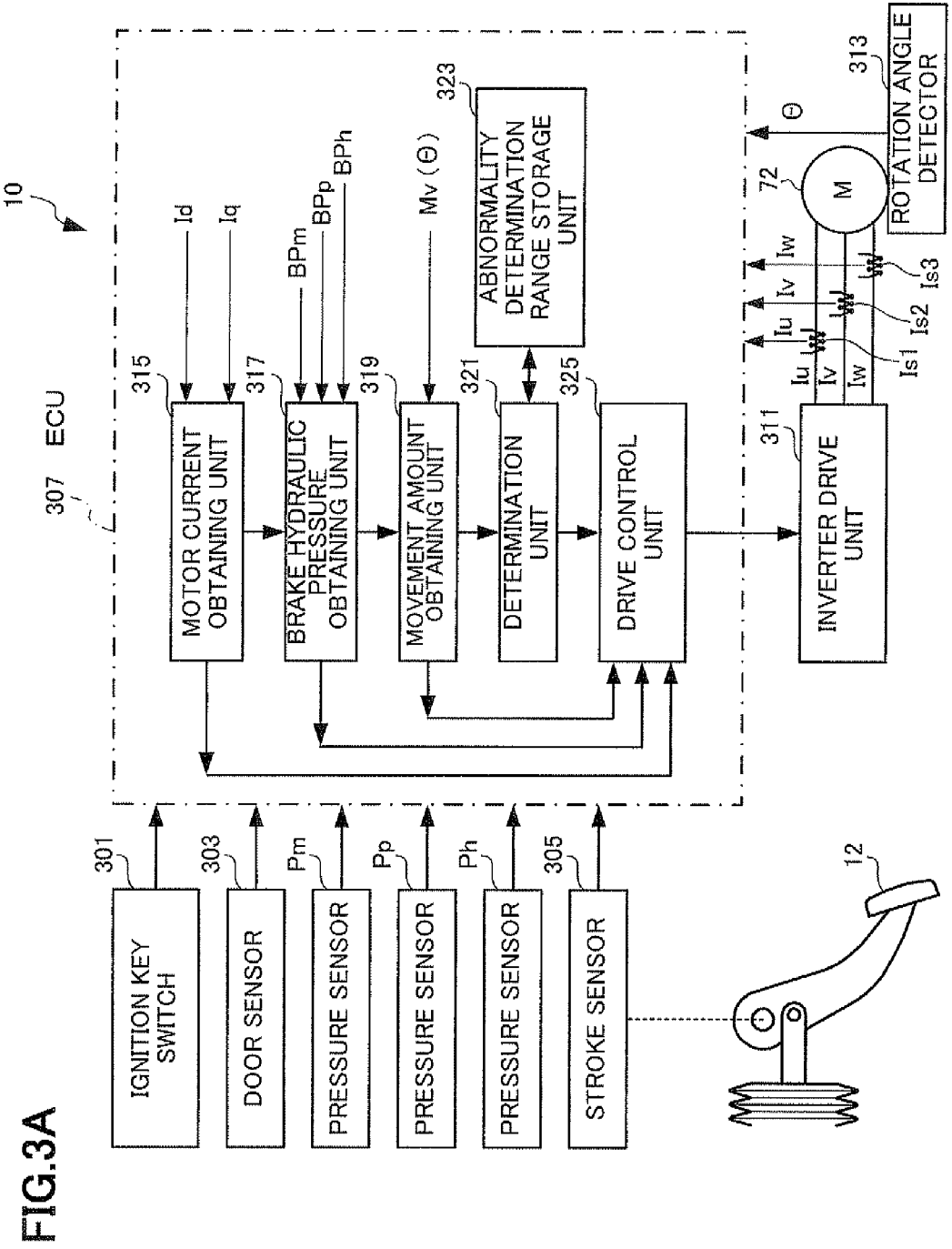
FIG. 3A is an explanatory diagram showing a configuration around an ECU included in the vehicle braking force generator according to the embodiment of the present invention.
Figure 3B:
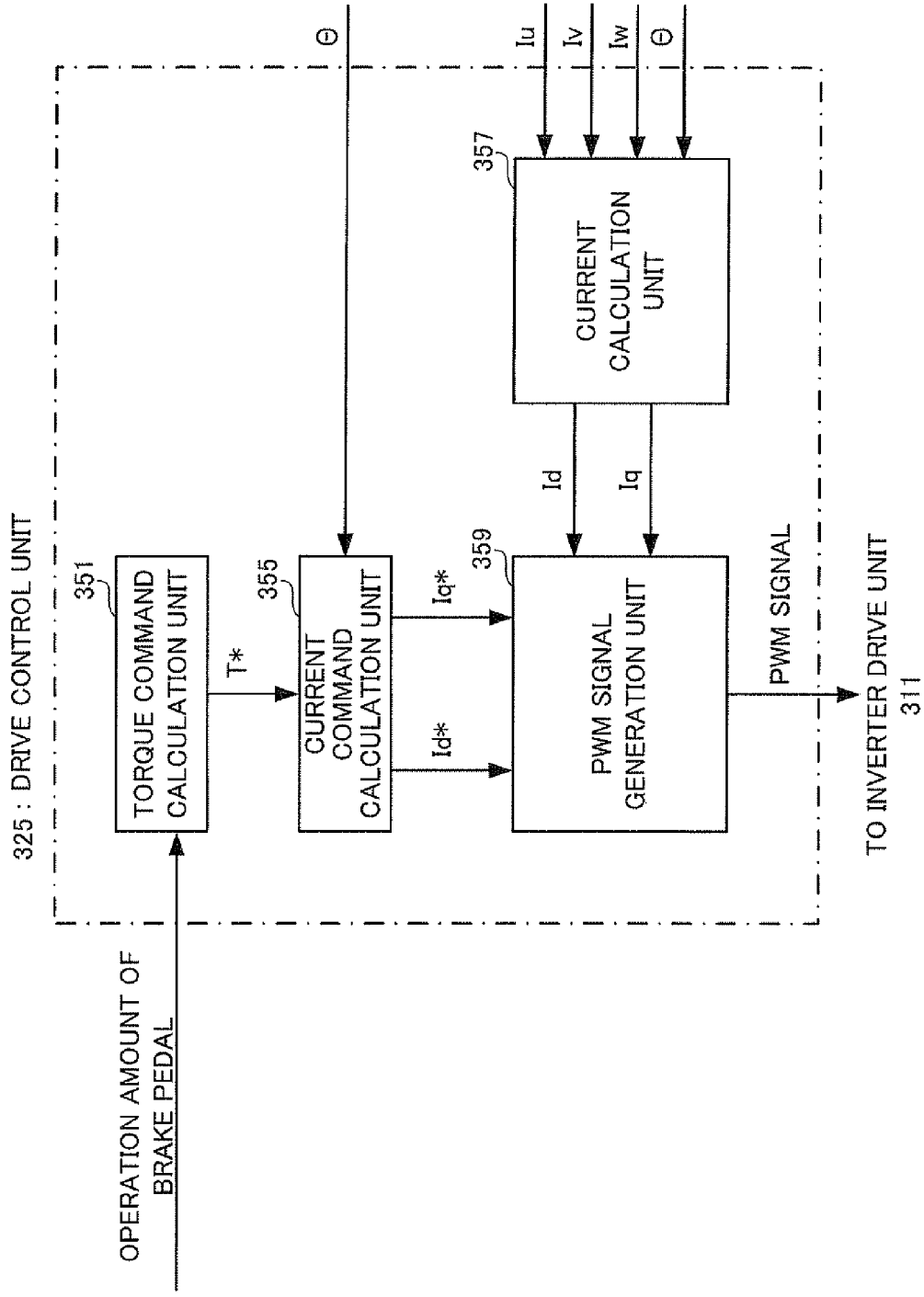
FIG. 3B is an explanatory diagram showing an internal configuration of a drive control unit included in the ECU.

Next, a configuration around the ECU 307 included in the vehicle braking force generator 10 according to the embodiment of the present invention will be described with reference to FIGS. 3A and 3B. FIG. 3A is an explanatory diagram showing the configuration around the ECU 307 included in the vehicle braking force generator 10 according to the embodiment of the present invention. FIG. 3B is an explanatory diagram showing an internal configuration of a drive control unit 325 included in the ECU 307.

As shown in FIG. 3A, an ignition key switch 301, a door sensor 303, the pressure sensors Pm, Pp, Ph, the stroke sensor 305, an inverter drive unit 311, current sensors Is1, Is2, Is3, and a rotation angle detector 313 are connected to the ECU 307 included in the vehicle braking force generator 10 according to the embodiment of the present invention.

The ignition key switch 301 is a switch operated when supplying power from a vehicle battery (not shown) to each part of the vehicle V. When the ignition key switch 301 is operated to be on, the ECU is operative to be supplied with power and activated.

The door sensor 303 has a function of detecting, for example, an opening and closing of a driver's door (not shown). An opening and closing signal of the driver's door detected by the door sensor 303 is transmitted to the ECU 307.

The stroke sensor 305 has a function of detecting an operation amount (stroke amount) of the brake pedal 12 by the driver. A signal according to the operation amount (stroke amount) of the brake pedal 12 detected by the stroke sensor 305 is transmitted to the ECU 307.

The inverter drive unit 311 has a function of inverter driving the electric motor 72 according to a PWM (Pulse Width Modulation) signal transmitted from the drive control unit 325 of the ECU 307. In detail, the inverter drive unit 311 converts a DC current of the vehicle battery to a three-phase AC current for supplying to the electric motor 72, and supplies the converted three-phase AC current to the electric motor 72. The inverter drive unit 311 has, for example, a three-phase bridge circuit (not shown).

The current sensors Is1, Is2, Is3 have functions of respectively detecting currents Iu, Iv, Iw of each phase of the three-phase current supplied from the inverter drive unit 311 to the electric motor 72. As the current sensors Is1, Is2, Is3, current sensors, for example, of a method using a shunt resistor, or a magnetic proportional method and a magnetic equilibrium method using a Hall element can be appropriately employed. The currents Iu, Iv, Iw of each phase detected by the current sensors Is1, Is2, Is3 are transmitted to the ECU 307.

The rotation angle detector 313 has a function of detecting a rotation angle (actually, a rotation angle of a rotor) θ according to the electric motor 72. As the rotation angle detector 313, for example, a resolver, a rotary encoder, or the like can be employed. Information related to the rotation angle θ according to the electric motor 72 detected by the rotation angle detector 313 is transmitted to a movement amount obtaining unit 319 of the ECU 307. The rotation angle θ according to the electric motor 72 detected by the rotation angle detector 313 corresponds to "a movement amount of the piston to the compression direction of the brake fluid with respect to the cylinder" of the present invention.

As shown in FIG. 3A, the ECU 307 is configured to include a motor current obtaining unit 315, a brake hydraulic pressure obtaining unit 317, the movement amount obtaining unit 319, a determination unit 319, an abnormality determination range storage unit 323, and the drive control unit 325.

The ECU 307 is composed of a microcomputer including a CPU (Central Processing Unit), a ROM (Read Only Memory), a RAM (Random Access Memory), and the like. The microcomputer is operative to read a program and data stored in the ROM and execute the program with the data, and perform an execution control according to various functions including a motor current obtaining function, a brake hydraulic pressure obtaining function, a movement amount obtaining function, a determination function, an abnormality determination range storage function, and a drive control function included in the ECU 307.

The motor current obtaining unit 315 has a function of obtaining a torque current Iq and a field current Id described later for driving the electric motor 72. Information according to the torque current Iq and the field current Id obtained by the motor current obtaining unit 315 are referenced when an operation state of the motor cylinder device 16 is determined in the determination unit 321.

The brake hydraulic pressure obtaining unit 317 has a function of obtaining information BPm, BPp, BPh (see FIG. 3A) according to the brake hydraulic pressures detected by the pressure sensors Pm, Pp, Ph. The information BPm, BPp, BPh according to the brake hydraulic pressures obtained by the brake hydraulic pressure obtaining unit 317 is referenced when the operation state of the motor cylinder device 16 is determined in the determination unit 321. In the following description, when the brake hydraulic pressures BPm, BPp, BPh are collectively referred to, they may be referred to as brake hydraulic pressure BP.

The movement amount obtaining unit 319 has a function of obtaining a movement amount Mv of the first and second slave pistons 88a, 88b to the compression direction of the brake fluid with respect to the cylinder unit 76. In the present invention, as the movement amount Mv of the first and second slave pistons 88a, 88b (hereinafter, may be referred to as a piston movement amount), the rotation angle θ according to the electric motor 72 is obtained from the rotation angle detector 313. However, the movement amount obtaining unit 319 may adopt, for example, the operation amount (stroke amount) of the brake pedal 12 by the driver.

The determination unit 321 has a function of determining the operation state of the motor cylinder device 16. In detail, the determination unit 321 is, for example, configured to determine that the motor cylinder device 16 is in abnormal state if a relationship between the motor current and the brake hydraulic pressure belongs to an abnormality determination range (see FIG. 5A) which deviates from a normality determination range having a predetermined width with a positive correlation, and the movement amount Mv obtained by the movement obtaining unit 319 is less than a predetermined movement amount threshold value Mvth (see FIG. 4), when the electric motor 72 is driven according to the operation amount of the brake pedal 12.

Figure 5A:
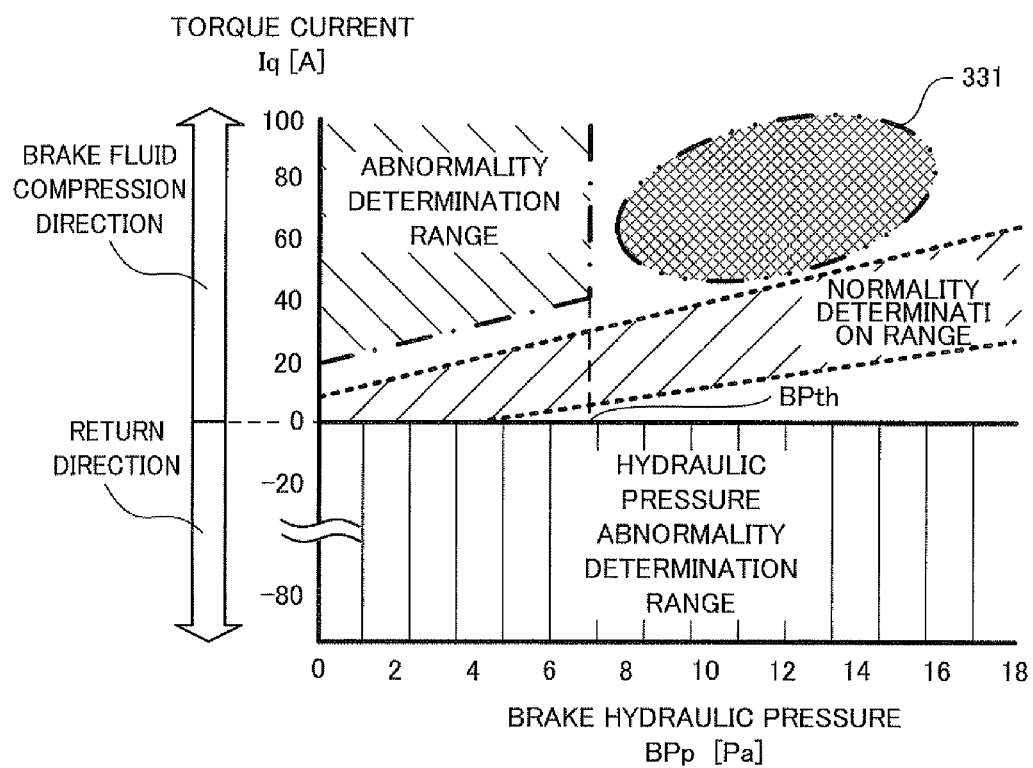
FIG. 5A is an explanatory diagram showing a relationship between a torque current and a brake hydraulic pressure in association with a normality determination range or an abnormality determination range.

The abnormality determination range storage unit 323 has a function of storing specific information according to the abnormality determination range (see FIG. 5A). The stored contents in the abnormality determination range storage unit 323 are referenced when the operation state of the motor cylinder device 16 is determined in the determination unit 321.

As shown in FIG. 3A, the drive control unit 325 has functions of performing a calculation of a torque command according to the electric motor 72 based on information or the like according to the movement amount Mv obtained by the movement amount obtaining unit 319, generating a PWM signal based on the torque command or the like obtained by the calculation according to the electric motor 72, and transmitting the generated PWM signal to the inverter drive unit 311.

Specifically, when the ECU 307 is activated by ON operation of the ignition key switch 301, and an origin position setting condition according to the opening of the driver's door is met, the drive control unit 325 performs a driving control of returning the electric motor 72 to the origin position OP when the rotation angle θ according to the electric motor 72 corresponding to the end position EP is obtained by the ECU 307, while performing a driving control of moving back the electric motor 72 to the end position EP.

More specifically, as shown in FIG. 3B, the drive control unit 325 includes a torque command calculation unit 351, a current command calculation unit 355, a current calculation unit 357, and a PWM signal generation unit 359. The drive control unit 325 performs the driving control of the electric motor 72 with reference to the currents Iu, Iv, Iw of each phase of U-, V-, W-phases flowing between the inverter drive unit 311 and the electric motor 72, and the feedback signal of the rotation angle θ according to the electric motor 72.

In order to perform a torque control of the electric motor 72 which is a three-phase AC motor, the drive control unit 325 uses a vector control. In the vector control, a primary current flowing through the electric motor 72 is controlled by being divided into the torque current Iq and the field current Id. The field current Id is a current component that generates a secondary flux to the electric motor 72 and is not involved in a direction of an output torque, i.e., the rotation direction of the electric motor 72. In contrast, the torque current Iq is a current component that has the electric motor 72 generate the output torque and is involved in the direction of the output torque (rotational direction of the electric motor 72). Thus, the rotational direction of the electric motor 72 is determined by a positive or negative sign given to the torque current Iq. The field current Id and the torque current Iq correspond to "motor currents according to the electric motor 72" of the present invention.

The torque command calculation unit 351 has a function of calculating a torque command T* of the electric motor 72 based on the operation amount or the like of the brake pedal 12.

The current command calculation unit 355 has a function of respectively calculating a torque current command Iq* and a field current command Id* of the electric motor 72 based on the rotation angle θ according to the electric motor 72 and the torque command T* calculated by the torque command calculation unit 351. The torque current command Iq* and the field current command Id* of the electric motor 72 calculated by the current command calculation unit 355 are referenced when the PWM signal is generated in the PWM signal generation unit 359 described later.

The current calculation unit 357 respectively calculates the torque current Iq and the field current Id of the electric motor 72 by using the rotation angle θ according to the electric motor 72 and the currents Iu, Iv, Iw of each phase flowing through the electric motor 72 and with reference to a known calculation formula for converting the three-phase current to a two-phase current. The torque current Iq and the field current Id of the electric motor 72 calculated by the current calculation unit 357 are referenced when the operation state of the motor cylinder device 16 is determined in the determination unit 321, and when the PWM signal is generated in the PWM signal generation unit 359 described next.

First, the PWM signal generation unit 359 respectively compares the torque current command Iq* and the field current command Id* calculated by the current command calculation unit 355, with the torque current Iq and the field current Id of the electric motor 72 calculated by the current calculation unit 357, and calculates a deviation of each corresponding component (torque current component or field current component).

Next, the PWM signal generation unit 359 converts the two-phase current command to the three-phase current command by performing a proportional calculation process and an integral calculation process on the above calculated deviation with reference to a known calculation formula for converting the two-phase current to the three-phase current, and generates the PWM signal having a duty ratio corresponding to a target voltage. The PWM signal generated by the PWM signal generation unit 359 and used for the drive control of the electric motor 72 is transmitted to the inverter drive unit 311.

The drive control unit 325 of the ECU 307 performs the drive control of the electric motor 72 based on the PWM signal obtained through the above sequential steps. The rotation angle θ according to the electric motor 72 varying with time in accordance with the drive control of the electric motor 72 is detected by the rotation angle detector 313 and transmitted to the drive control unit 325 and the movement amount obtaining unit 319 of the ECU 307.

[Operation of the Vehicle Braking Force Generator 10 According to the Embodiment of the Present Invention]

Next, the operation of the vehicle braking force generator 10 according to the embodiment of the present invention will be described with reference to FIG. 4. FIG. 4 is a flowchart showing a flow of an operation state determination process performed by the vehicle braking force generator 10 according to the embodiment of the present invention.

Note that the operation state determination process means a series of processes which the ECU 307 performs, including a process for determining the operation state of the motor cylinder device 16 and a process for controlling to a safe side (fail-safe control) the operation of the vehicle braking force generator 10 including the motor cylinder device 16 when it is determined that the motor cylinder device 16 is in abnormal as a result of this determination.

In Step S11 shown in FIG. 4, the motor current obtaining unit 315 of the ECU 307 obtains the field current Id and the torque current Iq as the motor currents according to the electric motor 72.

In Step S12, the brake hydraulic pressure obtaining unit 317 obtains the information BPm, BPp, BPh according to the brake hydraulic pressures detected by the pressure sensors Pm, Pp, Ph. In the following, unless otherwise specified, it is assumed that a description will be focused on "BPp" among the information BPm, BPp, BPh according to the brake hydraulic pressures.

In Step S13, the movement amount obtaining unit 319 obtains the piston movement amount Mv to the compression direction of the brake fluid. Specifically, the movement amount obtaining unit 319 obtains the rotation angle θ according to the electric motor 72 as the piston movement amount Mv from the rotation angle detector 313.

In Step S14, the ECU 307 checks whether or not the electric motor 72 is driven to the compression direction of the brake fluid. If the electric motor 72 is not driven to the compression direction of the brake fluid ("No" in Step S14), the ECU 307 returns the flow of the process to Step S11 and repeats the process of Steps S11 to S14 until it is determined that the electric motor 72 is driven to the compression direction of the brake fluid.

On the other hand, if it is determined that the electric motor 72 is driven to the compression direction of the brake fluid ("Yes" in Step S14), the ECU 307 moves the flow of the process to the next Step S15.

In Step S15, the determination unit 321 of the ECU 307 determines whether or not the relationship between the torque current Iq (motor current) and the brake hydraulic pressure BPp belongs to the abnormality determination range, with reference to the stored contents of the abnormality determination range storage unit 323. If it is determined that the relationship between the torque current Iq (motor current) and the brake hydraulic pressure BPp does not belong to the abnormality determination range ("No" in Step S15) as a result of the determination in Step S15, the ECU 307 returns the flow of the process to Step S11 and repeats the process of Steps S11 to S15 until it is determined that the relationship between the torque current Iq and the brake hydraulic pressure BPp belongs to the abnormality determination range.

On the other hand, if it is determined that the relationship between the torque current Iq and the brake hydraulic pressure BPp belongs to the abnormality determination range ("Yes" in Step S15), the ECU 307 moves the flow of the process to the next Step S16.

In Step S16, the determination unit 321 of the ECU 307 determines whether or not the piston movement amount Mv is less than the predetermined movement amount threshold value Mvth.

If it is determined that the piston movement amount Mv is not less than the predetermined movement amount threshold value Mvth ("No" in Step S16) as a result of the determination in Step S16, the ECU 307 returns the flow of the process to Step S11 and repeats the process of Steps S11 to S16 until it is determined that the piston movement amount Mv is less than the predetermined movement amount threshold value Mvth.

On the other hand, if it is determined that the piston movement amount Mv is less than the predetermined movement amount threshold value Mvth ("Yes" in Step S16) as a result of the determination in Step S16, the ECU 307 moves the flow of the process to the next Step S17.

In Step S17, the determination unit 321 of the ECU 307 determines whether or not the piston movement amount Mv is substantially constant regardless of a lapse of time.

If it is determined that the piston movement amount Mv is varied with the lapse of time ("No" in Step S17) as a result of the determination in Step S17, the ECU 307 returns the flow of the process to Step S11 and repeats the process of Steps S11 to S17 until it is determined that the piston movement amount Mv is substantially constant regardless of the lapse of time.

On the other hand, if it is determined that the piston movement amount Mv is substantially constant regardless of the lapse of time ("Yes" in Step S17) as a result of the determination in Step S17, the ECU 307 moves the flow of the process to the next Step S18.

In Step S18, the determination unit 321 of the ECU 307 determines whether or not a time variation amount IV of the torque current Iq is equal to or more than a predetermined variation amount threshold value IVth.

If it is determined that the time variation amount IV of the torque current Iq is less than the predetermined variation amount threshold value IVth ("No" in Step S18) as a result of the determination in Step S18, the ECU 307 returns the flow of the process to Step S11 and repeats the process of Steps S11 to S18 until it is determined that the time variation amount IV of the torque current Iq is equal to or more than a predetermined variation amount threshold value IVth.

On the other hand, if it is determined that the time variation amount IV of the torque current Iq is equal to or more than the predetermined variation amount threshold value IVth ("Yes" in Step S18) as a result of the determination in Step S18, the ECU 307 moves the flow of the process to the next Step S19.

In Step S19, the determination unit 321 of the ECU 307 determines that the motor cylinder device 16 is in abnormal state (there is a high probability that the power transmission mechanism 74 has fallen into a lock failure).

In Step S20, the ECU 307 performs the process for controlling to the safe side (fail-safe control) the operation of the vehicle braking force generator 10 including the motor cylinder device 16. Specifically, the ECU 307 assumes there is a high probability that the power transmission mechanism 74 has fallen into the lock failure, and performs the fail-safe control that activates the conventional hydraulic pressure type brake system in place of the by-wire type brake system.

[Detailed Description of the Operation State Determination Process]

Figure 5B:
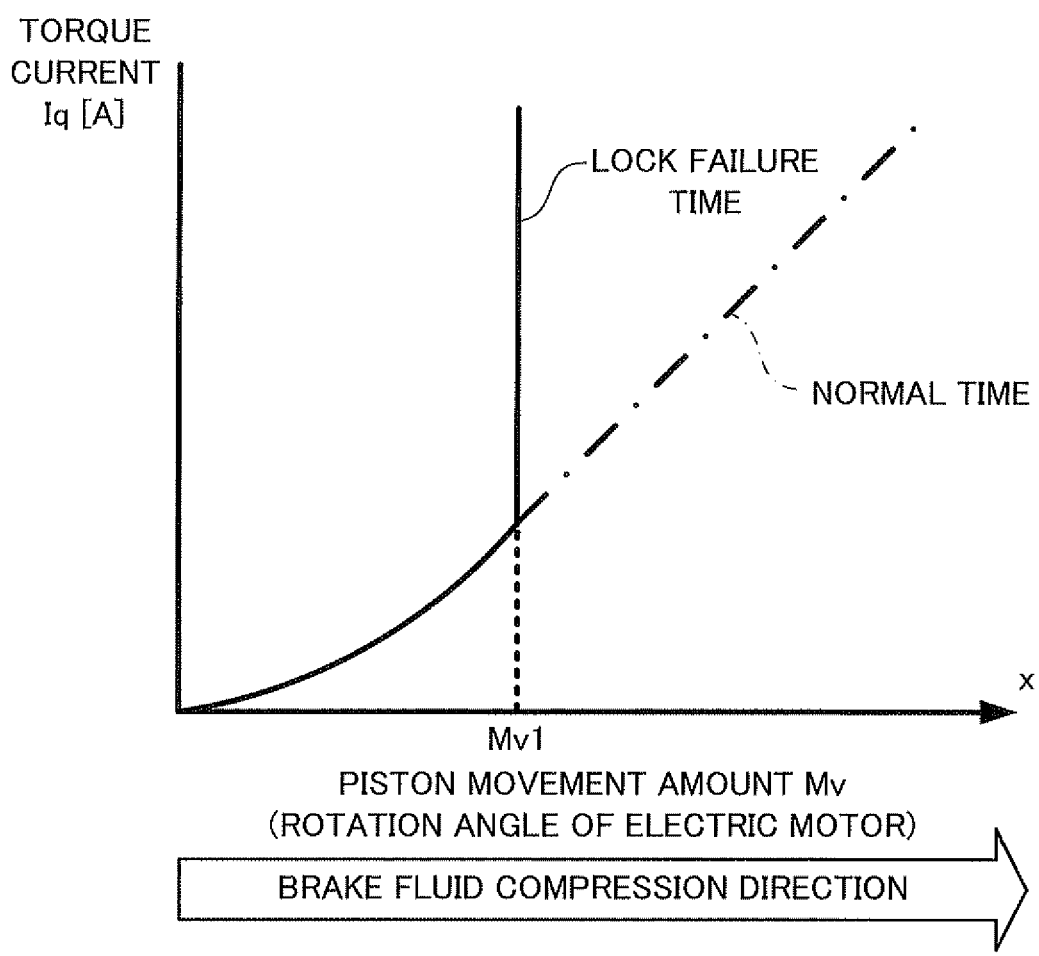
FIG. 5B is an explanatory diagram showing a relationship between a torque current and a piston movement amount in normal state and abnormal state of the motor cylinder device.

Next, the operation state determination process performed by the vehicle braking force generator 10 according to the embodiment of the present invention will be described in detail with reference to FIGS. 5A and 5B. FIG. 5A is an explanatory diagram showing the relationship between the torque current Iq and the brake hydraulic pressure BPp in association with the normality determination range or the abnormality determination range. FIG. 5B is an explanatory diagram showing a relationship between the torque current Iq and the piston movement amount Mv in normal state and abnormal state of the motor cylinder device 16.

As abnormal states of the motor cylinder device 16, two major states are assumed. The first abnormal state is a sticking in the power transmission mechanism 74 including a biting of a foreign matter into a speed reducing gear (hereinafter, may be simply referred to as "lock"). And the second abnormal state is a brake fluid leak (hereinafter, may be simply referred to as "leak"). There are two cases of "leak", that is, one case is a leak in either one of the first hydraulic pressure system 70a and the second hydraulic pressure system 70b, and the other case is a leak in both systems. The present embodiment is capable of detecting properly the two abnormal states of the motor cylinder device 16.

When the operation state of the motor cylinder device 16 is normal, the brake hydraulic pressure BPp tends to increase in response to an increase of the torque current Iq (see the normality determination range in FIG. 5A). Further, the piston movement amount Mv also tends to increase in response to the increase of the torque current Iq. Furthermore, a relationship between the piston movement amount Mv and the brake hydraulic pressure BPp have a positive correlation. Therefore, it is possible to detect that the motor cylinder device 16 is normal by monitoring correlations among the torque current Iq, the brake hydraulic pressure BPp, and the piston movement amount Mv.

On the other hand, when the operation state of the motor cylinder device 16 is in the lock failure, the power transmission mechanism 74 including the speed reducing gear does not transmit the driving force of the electric motor 72 to the first and second slave pistons 88a, 88b. Therefore, the brake hydraulic pressure BPp tends to maintain a substantially constant value even if the torque current Iq increases (see the abnormality determination range in FIG. 5A). Similarly, the piston movement amount Mv also tends to maintain a substantially constant value even if the torque current Iq increases (see the characteristic line in the lock failure time in FIG. 5B). Incidentally, the characteristic line in the lock failure time in FIG. 5B shows an example in which the lock failure occurs in the middle of the piston movement amount Mv increasing to the brake fluid compression direction (see a piston movement amount Mv1 in FIG. 5B).

Therefore, it is possible to detect that the lock failure occurs in the motor cylinder device 16 by monitoring a variation of the brake hydraulic pressure BPp or the piston movement amount Mv when the torque current Iq is increased.

When the operation state of the motor cylinder device 16 is in a leak abnormality, the hydraulic circuit itself through the brake fluid does not operate. Therefore, the brake hydraulic pressure BPp tends to maintain a state of being suppressed low even if the torque current Iq is increased (see the abnormality determination range in FIG. 5A). Further, the brake hydraulic pressure BPp tends to maintain the state of being suppressed low even if the piston movement amount Mv is increased.

Incidentally, when the leak occurs in only one system of the first hydraulic pressure system 70a and the second hydraulic pressure system 70b, the brake hydraulic pressure BPp tends to maintain the state of being suppressed low even if the torque current Iq is increased. When the leaks occur in both of the first hydraulic pressure system 70a and the second hydraulic pressure system 70b, a load which is a drag when driving the electric motor 72 is only a spring force of the first and second return springs 96a, 96b. In this case, the torque current Iq does not increase and the brake hydraulic pressures BPp, BPh tend to maintain the states of being suppressed low together.

Therefore, it is possible to detect that the leak abnormality occurs in the motor cylinder device 16 by monitoring the variation of the brake hydraulic pressure BP when the piston movement amount Mv or the torque current Iq is increased.

In addition, as one more abnormal state of the motor cylinder device 16, a hydraulic pressure abnormality can be mentioned. The hydraulic pressure abnormality means a state in which the brake hydraulic pressure BPp occurs when the electric motor 72 is driven to the return direction (direction opposite to the compression direction of the brake fluid) (see the hydraulic pressure abnormality determination range in FIG. 5A). In the normal state of the motor cylinder device 16, the brake hydraulic pressure BPp does not occur when the electric motor 72 is driven to the return direction.

Therefore, it is possible to detect whether or not the operation state of the motor cylinder device 16 has fallen into the hydraulic pressure abnormality by monitoring over time the correlation between the brake hydraulic pressure BPp and the torque current (current value in the return direction is expressed by attaching a minus sign) Iq.

A range 331 shown in FIG. 5A is a range in which the brake hydraulic pressure BPp is high relative to the torque current Iq. It is assumed, for example, that the relationship between the brake hydraulic pressure BPp and the torque current Iq belongs to the range 331 when the VSA device 18 is operated. Even if the relationship between the brake hydraulic pressure BPp and the torque current Iq belongs to the range 331 due to the abnormal state, it is possible to maintain the braking function by receiving a backup by the master cylinder 34, because the brake hydraulic pressure BPp is high. Therefore, the range 331 is excluded from the abnormality determination range.

[Operation Effects of the Vehicle Braking Force Generator 10 According to the Embodiment of the Present Invention]

Next, operation effects of the vehicle braking force generator 10 according to the embodiment of the present invention will be described. The vehicle braking force generator 10 on a first aspect includes the cylinder unit (cylinder) 76, the first and second slave pistons 88a, 88b, and the electric motor 72 driving the pistons 88a, 88b via the power transmission mechanism 74 including the speed reducing gear. The vehicle braking force generator 10 on the first aspect further includes the motor cylinder device (electric hydraulic pressure generation unit) 16, the motor current obtaining unit 315, the brake hydraulic pressure obtaining unit 317, the movement amount obtaining unit 319, and the determination unit 321. When the electric motor 72 is driven according to the operation amount of the brake pedal (braking operation member) 12 by the driver, by receiving the driving force, the pistons 88a, 88b move to the compression direction of the brake fluid via the power transmission mechanism 74 relative to the cylinder unit (cylinder) 76, so that the motor cylinder device (electric hydraulic pressure generation unit) 16 generates the brake hydraulic pressure according to the operation amount of the brake pedal (braking operation member) 12. The motor current obtaining unit 315 obtains the torque current Iq (motor current) according to the electric motor 72. The brake hydraulic pressure obtaining unit 317 obtains the brake hydraulic pressure generated in the cylinder unit (cylinder) 76. The movement amount obtaining unit 319 obtains the movement amount Mv of the pistons 88a, 88b to the compression direction of the brake fluid relative to the cylinder unit (cylinder) 76. The determination unit 321 determines the operation state of the motor cylinder device (electric hydraulic pressure generation unit) 16.

In the vehicle braking force generator 10 on the first aspect, when the electric motor 72 is driven according to the operation amount of the brake pedal (braking operation member) 12, the determination unit 321 determines that the motor cylinder device (electric hydraulic pressure generation unit) 16 is in abnormal state if the relationship between the torque current Iq (motor current) and the brake hydraulic pressure BP belongs to the abnormality determination range which deviates from the normality determination range having the predetermined width with the positive correlation, and the movement amount Mv is less than the predetermined movement amount threshold value (appropriately set in advance by considering the determination of the leak abnormality) Mvth.

If the relationship between the torque current Iq (motor current) and the brake hydraulic pressure BP belongs to the abnormality determination range, there is a high probability that has fallen into the lock failure or the leak abnormality, for example. If the movement amount Mv is less than the movement amount threshold value Mvth, there is a high probability that the hydraulic circuit operates properly and the leak abnormality does not occur.

According to the vehicle braking force generator 10 on the first aspect, it is possible to detect quickly the sticking (lock failure) in the power transmission mechanism 74 including the biting of the foreign matter into the speed reducing gear, even if the brake fluid leak (leak abnormality) occurs.

Further, in the vehicle braking force generator 10 on the first aspect, a configuration may be adopted such that the determination unit 321 determines that the motor cylinder device (electric hydraulic pressure generation unit) 16 is in abnormal state if the movement amount Mv is substantially constant.

In the vehicle braking force generator 10 on the first aspect, if the movement amount Mv is substantially constant, there is a high probability that has fallen into the lock failure. Because it is a typical symptom in the lock failure time, for example, that the movement amount Mv is substantially constant in spite of the increase in the torque current Iq (motor current). Therefore, according to the vehicle braking force generator 10 on the first aspect, it is possible to detect the lock failure quickly and properly.

Further, in the vehicle braking force generator 10 on the first aspect, a configuration may be adopted such that the determination unit 321 determines that the motor cylinder device (electric hydraulic pressure generation unit) 16 is in abnormal state if the time variation amount IV of the torque current Iq (motor current) is equal to or more than the predetermined variation amount threshold value (appropriately set in advance by considering the determination of the lock failure) IVth, when the electric motor 72 is driven according to the operation amount of the brake pedal (braking operation member) 12.

In the vehicle braking force generator 10 on the first aspect, when the electric motor 72 is driven according to the operation amount of the brake pedal (braking operation member) 12, if the time variation amount IV of the torque current Iq (motor current) is equal to or more than the predetermined variation amount threshold value IVth, there is a high probability that has fallen into the lock failure. Because it is a typical symptom in the lock failure time, for example, that the time variation amount IV of the torque current Iq (motor current) is equal to or more than the predetermined variation amount threshold value IVth when the electric motor 72 is driven as described above.

Therefore, according to the vehicle braking force generator 10 on the first aspect, it is possible to detect the lock failure quickly and properly even if the leak abnormality occurs.

Further, in the vehicle braking force generator 10 on the first aspect, a configuration may be adopted such that the abnormality determination range is a range in which the hydraulic pressure BP is less than the predetermined hydraulic pressure threshold value (appropriately set in advance by considering the determination of the lock failure or the leak abnormality) BPth (see FIG. 5A).

In the vehicle braking force generator 10 on the first aspect, when the electric motor 72 is driven according to the operation amount of the brake pedal (braking operation member) 12, if the relationship between the torque current Iq (motor current) and the brake hydraulic pressure BP belongs to the abnormality determination range and the movement amount Mv is less than the predetermined movement amount threshold value Mvth, the determination unit 321 determines that the motor cylinder device (electric hydraulic pressure generation unit) 16 is in abnormal state.

Therefore, according to the vehicle braking force generator 10 on the first aspect, it is possible to detect the lock failure and the leak abnormality quickly and properly.

On the other hand, the vehicle braking force generator 10 on a second aspect includes the cylinder unit (cylinder) 76, the first and second slave pistons 88a, 88b, and the electric motor 72 driving the pistons 88a, 88b via the power transmission mechanism 74 including the speed reducing gear. The vehicle braking force generator 10 on the second aspect further includes the motor cylinder device (electric hydraulic pressure generation unit) 16, the motor current obtaining unit 315, the movement amount obtaining unit 319, and the determination unit 321. When the electric motor 72 is driven according to the operation amount of the brake pedal (braking operation member) 12 by the driver, by receiving the driving force, the pistons 88a, 88b move to the compression direction of the brake fluid via the power transmission mechanism 74 relative to the cylinder unit (cylinder) 76, so that the motor cylinder device (electric hydraulic pressure generation unit) 16 generates the brake hydraulic pressure according to the operation amount of the brake pedal (braking operation member) 12. The motor current obtaining unit 315 obtains the torque current Iq (motor current) according to the electric motor 72. The movement amount obtaining unit 319 obtains the movement amount Mv of the pistons 88a, 88b to the compression direction of the brake fluid relative to the cylinder unit (cylinder) 76. The determination unit 321 determines the operation state of the motor cylinder device (electric hydraulic pressure generation unit) 16.

In the vehicle braking force generator 10 on the second aspect, when the electric motor 72 is driven according to the operation amount of the brake pedal (braking operation member) 12, if the time variation amount IV of the torque current Iq (motor current) is equal to or more than the predetermined variation amount threshold value IVth and the movement amount Mv is substantially constant, the determination unit 321 determines that the motor cylinder device (electric hydraulic pressure generation unit) 16 is in abnormal state.

In the vehicle braking force generator 10 on the second aspect, when the electric motor 72 is driven according to the operation amount of the brake pedal (braking operation member) 12, if the time variation amount IV of the torque current Iq (motor current) is equal to or more than the predetermined variation amount threshold value IVth, there is a high probability that has fallen into the lock failure. Because it is a typical symptom in the lock failure time, for example, that the time variation amount IV of the torque current Iq (motor current) is equal to or more than the predetermined variation amount threshold value IVth when the electric motor 72 is driven as described above.

In the vehicle braking force generator 10 on the second aspect, when the electric motor 72 is driven according to the operation amount of the brake pedal (braking operation member) 12, if the movement amount Mv is substantially constant, there is a high probability that has fallen into the lock failure. Because it is a typical symptom in the lock failure time, for example, that the movement amount Mv is substantially constant in spite of the increase of the torque current Iq (motor current).

Therefore, according to the vehicle braking force generator 10 on the second aspect, it is possible to detect the lock failure more properly. As a result, it is possible to improve significantly the reliability of the by-wire type brake system.

Further, the vehicle braking force generator 10 on a third aspect includes the cylinder unit (cylinder) 76, the first and second slave pistons 88a, 88b, and the electric motor 72 driving the pistons 88a, 88b via the power transmission mechanism 74 including the speed reducing gear. The vehicle braking force generator 10 on the third aspect further includes the motor cylinder device (electric hydraulic pressure generation unit) 16, the motor current obtaining unit 315, the movement amount obtaining unit 319, and the determination unit 321. When the electric motor 72 is driven according to the operation amount of the brake pedal (braking operation member) 12 by the driver, by receiving the driving force, the pistons 88a, 88b move to the compression direction of the brake fluid via the power transmission mechanism 74 relative to the cylinder unit (cylinder) 76, so that the motor cylinder device (electric hydraulic pressure generation unit) 16 generates the brake hydraulic pressure according to the operation amount of the brake pedal (braking operation member) 12. The motor current obtaining unit 315 obtains the torque current Iq (motor current) according to the electric motor 72. The movement amount obtaining unit 319 obtains the movement amount Mv of the pistons 88a, 88b to the compression direction of the brake fluid relative to the cylinder unit (cylinder) 76. The determination unit 321 determines the operation state of the motor cylinder device (electric hydraulic pressure generation unit) 16.

In the vehicle braking force generator 10 on the third aspect, when the electric motor 72 is driven according to the operation amount of the brake pedal (braking operation member) 12, if the time variation amount IV of the torque current Iq (motor current) is equal to or more than the variation amount threshold value IVth, and the movement amount Mv is equal to or more than the predetermined threshold value Mvth and substantially constant, the determination unit 321 determines that the motor cylinder device (electric hydraulic pressure generation unit) 16 is in abnormal state.

In the vehicle braking force generator 10 on the third aspect, when the electric motor 72 is driven according to the operation amount of the brake pedal (braking operation member) 12, if the time variation amount IV of the torque current Iq (motor current) is equal to or more than the predetermined variation amount threshold value IVth, there is a high probability that has fallen into the lock failure. Because it is a typical symptom in the lock failure time, for example, that the time variation amount IV of the torque current Iq (motor current) is equal to or more than the predetermined variation amount threshold value IVth when the electric motor 72 is driven as described above.

In the vehicle braking force generator 10 on the third aspect, when the electric motor 72 is driven according to the operation amount of the brake pedal (braking operation member) 12, if the movement amount Mv is equal to or more than the predetermined threshold value Mvth and substantially constant, there is a high probability that has fallen into the lock failure similarly to the above. Because it is a typical symptom in the lock failure time, for example, that the movement amount Mv is equal to or more than the predetermined threshold value Mvth and substantially constant in spite of the increase of the torque current Iq (motor current).

Therefore, according to the vehicle braking force generator 10 on the third aspect, it is possible to detect the lock failure more properly. As a result, it is possible to improve significantly the reliability of the by-wire type brake system.

Other Embodiments

A plurality of embodiments described above show examples of embodiments of the present invention. Accordingly, the technical scope of the present invention should not be construed restrictively thereby. It is because the present invention can be embodied in various forms without departing from its major characteristics or spirit.

Disclosure of First and Second Reference Examples

Figure 5C:
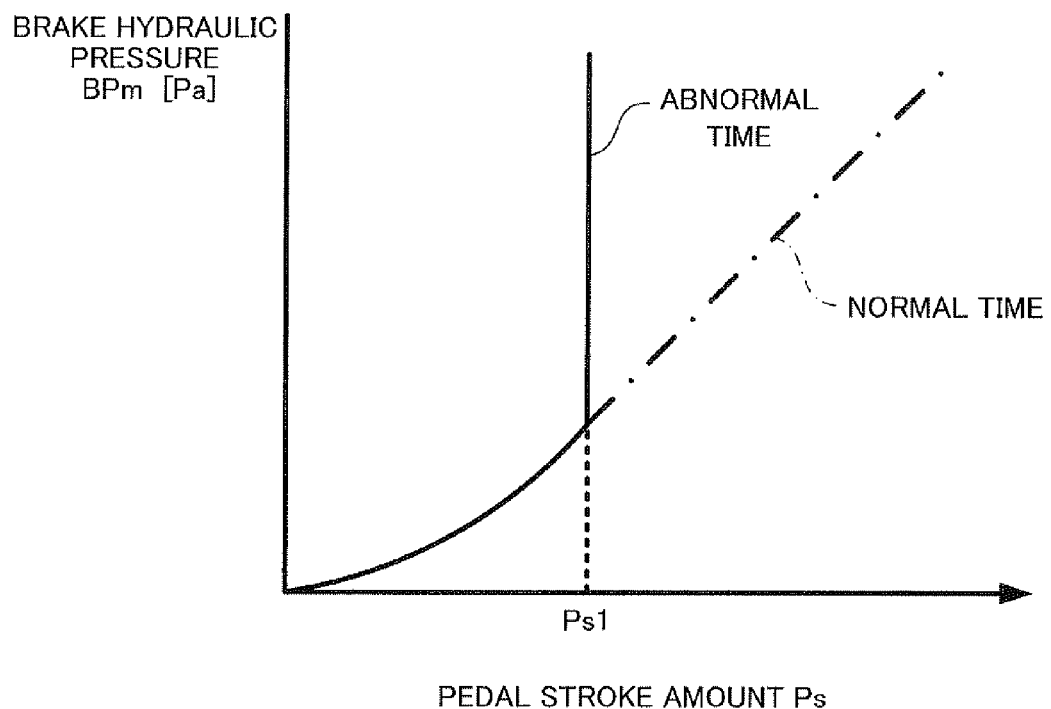
FIG. 5C is an explanatory diagram showing a relationship of a brake hydraulic pressure to a pedal stroke amount in normal state and abnormal state of a stroke sensor (a first reference example).
Figure 5D:
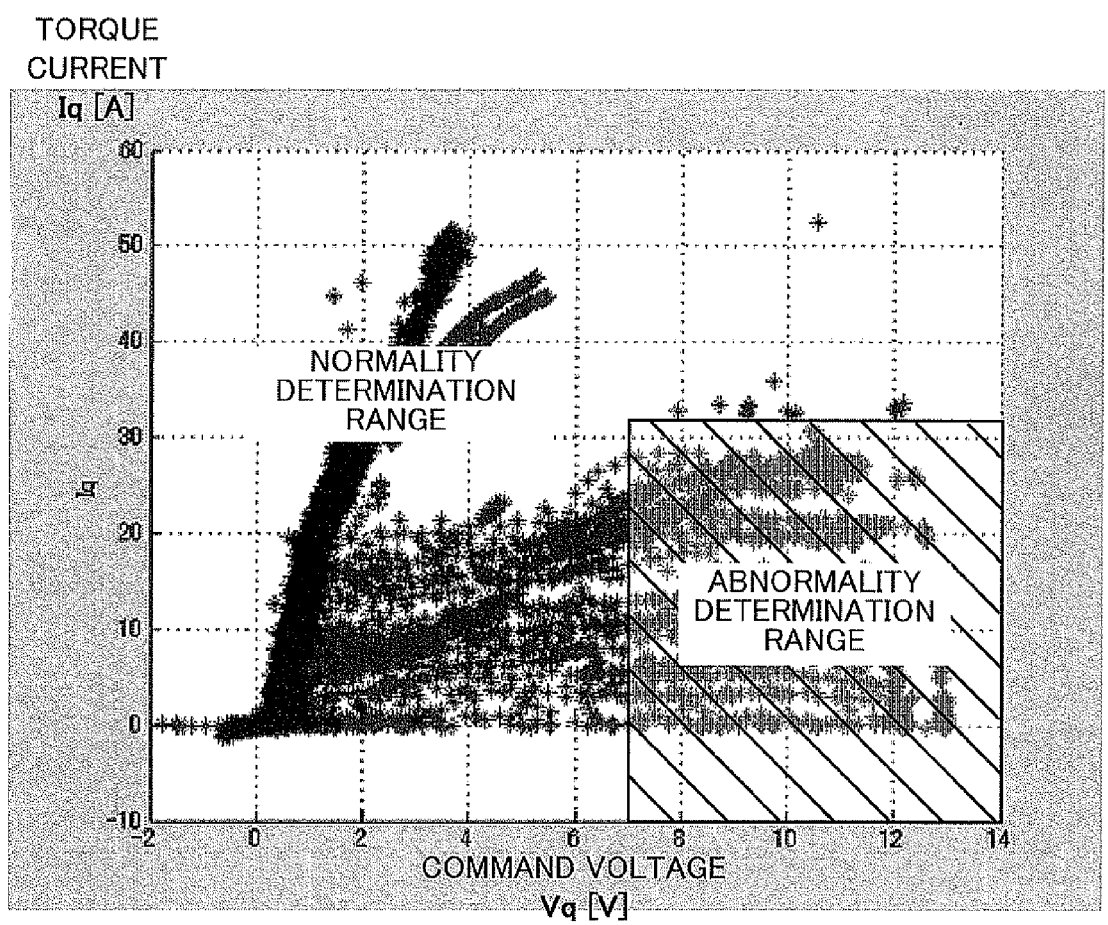
FIG. 5D is an explanatory diagram showing a relationship between a torque current and a command voltage in association with a normality determination range or an abnormality determination range (a second reference example).

Next, the first and second reference examples will be described with reference to accompanying drawings. FIG. 5C is an explanatory diagram showing a relationship of the brake hydraulic pressure to a pedal stroke amount in normal state and abnormal state of the stroke sensor (the first reference example). FIG. 5D is an explanatory diagram showing a relationship between the torque current and a command voltage in association with the normality determination range or the abnormality determination range (the second reference example). Incidentally, each of the first and second reference examples has constituent parts in common with the vehicle braking force generator 10 according to the embodiment of the present invention. Therefore, the descriptions of the first and second reference examples will be substituted by describing each of parts different from the vehicle braking force generator 10 according to the embodiment of the present invention.

In a vehicle braking force generator according to the first reference example, if an abnormality occurs in a stroke detection part of the stroke sensor 305, a detection value according to the operation amount (stroke amount) of the brake pedal 12 by the driver cannot be transmitted to the ECU 307. As a result, it becomes impossible to operate properly the by-wire type brake system. Therefore, in the first reference example, a configuration described below is adopted for detecting the abnormal state of the stroke sensor 305.

As a prerequisite, if the operation state of the stroke sensor 305 is normal, the brake hydraulic pressure BPm of the pressure sensor Pm and a pedal stroke amount Ps show a positive correlation in which the brake hydraulic pressure BPm increases when the pedal stroke amount Ps increases, and vice versa (see a characteristic line (alternate long and short dash line) in normal time in FIG. 5C).

On the other hand, if an abnormality occurs in the detection part of the stroke sensor 305, for example, the detection value according the operation amount (stroke amount) of the brake pedal 12 by the driver falls into an unchanging state. Therefore, the pedal stroke amount Ps tends to maintain a substantially constant value even if the brake hydraulic pressure BPm increases. Note that the characteristic line (solid line) in abnormal time in FIG. 5C shows an example in which an abnormality occurs in the detection part of the stroke sensor 305 in the middle of the pedal stroke amount Ps proceeding to the brake fluid compression direction (see a pedal stroke amount Psi in FIG. 5C).

Therefore, according to the vehicle braking force generator according to the first reference example, it is possible to detect whether or not the operation state of the stroke sensor 305 is normal by monitoring over time the correlation of the brake hydraulic pressure BPm to the pedal stroke amount Ps.

Next, the second reference example will be described. In a vehicle braking force generator according to the second reference example, if a disconnection abnormality occurs in a signal line or a power supply line of the electric motor 72 in the motor cylinder device 16, the driving force of the electric motor 72 cannot be transmitted to the first and second slave pistons 88a, 88b. As a result, it becomes impossible to operate properly the by-wire type brake system. Therefore, in the second reference example, a configuration described below is adopted for detecting the disconnection abnormality according to the electric motor 72 in the motor cylinder device 16.

As a prerequisite, in a normal time when no disconnection occurs in the electric motor 72 in the motor cylinder device 16, the torque current Iq of the electric motor 72 and a command voltage Vq fundamentally show a positive correlation in which the torque current Iq increases when the command voltage Vq increases, and vice versa (see characteristic lines belonging to the normality determination range in FIG. 5D). Incidentally, as the command voltage Vq, a voltage value corrected appropriately may be adopted in consideration of a voltage variation of the vehicle battery.

On the other hand, in an abnormal time when a disconnection occurs in the electric motor 72 in the motor cylinder device 16, for example, the detection value according the operation amount (stroke amount) of the brake pedal 12 by the driver falls into an unchanging state. Therefore, the torque current Iq tends not to increase so much even if the command voltage Vq increases (see characteristic lines belonging to the abnormality determination range in FIG. 5D).

Therefore, according to the vehicle braking force generator according to the second reference example, it is possible to detect whether or not the disconnection abnormality occurs in the electric motor 72 in the motor cylinder device 16 by monitoring over time the correlation between the torque current Iq of the electric motor 72 and the command voltage Vq. Note that, in the vehicle braking force generator according to the second reference example, it may be set as a condition for detecting whether or not the disconnection abnormality occurs as described above that the first and second slave pistons 88*a*, 88*b* are in holding states and a current value according to the signal line or the power supply line of the electric motor 72 is zero, in addition to that the correlation between the torque current Iq of the electric motor 72 and the command voltage Vq belongs to the abnormality determination range. With this configuration, it is possible to detect more properly whether or not the disconnection abnormality occurs in the electric motor 72 in the motor cylinder device 16.

Finally, the relationship between the vehicle braking force generator 10 according to the embodiment of the present invention and the vehicle braking force generator according to the first and second reference examples will be described. As the vehicle braking force generator 10 according to the embodiment of the present invention, a configuration may be adopted such that the operation state of the motor cylinder device (electric hydraulic pressure generation unit) 16 is determined when it is determined that the operation state of the stroke sensor 305 is normal in the vehicle braking force generator according to the first reference example. Further, as the vehicle braking force generator 10 according to the embodiment of the present invention, a configuration may be adopted such that the operation state of the motor cylinder device (electric hydraulic pressure generation unit) 16 is determined when it is determined that the disconnection abnormality does not occur in the electric motor 72 in the motor cylinder device 16 in the vehicle braking force generator according to the second reference example. Furthermore, as the vehicle braking force generator 10 according to the embodiment of the present invention, a configuration may be adopted such that the operation state of the motor cylinder device (electric hydraulic pressure generation unit) 16 is determined when it is determined that the operation state of the stroke sensor 305 is normal in the vehicle braking force generator according to the first reference example and the disconnection abnormality does not occur in the electric motor 72 in the motor cylinder device 16 in the vehicle braking force generator according to the second reference example.

REFERENCE SIGNS LIST

10: vehicle braking force generator
12: brake pedal (braking operation member)
16: motor cylinder device (electric hydraulic pressure generation unit)
72: electric motor
74: power transmission mechanism
76: cylinder unit (cylinder)
88*a*: first slave piston (piston)
88*b*: second slave piston (piston)
315: motor current obtaining unit
317: brake hydraulic pressure obtaining unit
319: movement amount obtaining unit
321: determination unit
10: vehicle
Pm, Pp, Ph: pressure sensor
Iq: torque current (motor current)

The invention claimed is:

1. A vehicle braking force generator comprising:
an electric hydraulic pressure generation unit that includes a cylinder, a piston, and an electric motor which drives the piston via a power transmission mechanism including a speed reducing gear, and when the electric motor is driven according to an operation amount of a braking operation member, by receiving a driving force, the piston moves to a compression direction of a brake fluid with respect to the cylinder via the power transmission mechanism, thereby generating a brake hydraulic pressure corresponding to the operation amount of the brake operation member;
a motor current obtaining unit that obtains a motor current according to the electric motor;
a brake hydraulic pressure obtaining unit that obtains a brake hydraulic pressure generated in the cylinder;
a movement amount obtaining unit that obtains a movement amount of the piston to the compression direction of the brake fluid with respect to the cylinder; and
a determination unit that determines an operation state of the electric hydraulic pressure generation unit, wherein
when the electric motor is driven according to the operation amount of the braking operation member, the determination unit determines that the electric hydraulic pressure generation unit is in abnormal state if a relationship between the motor current and the brake hydraulic pressure belongs to an abnormality determination range which deviates from a normality determination range having a predetermined width with a positive correlation, and the movement amount is less than a predetermined movement amount threshold value; and
wherein when the electric motor is driven according to the operation amount of the braking operation member, the determination unit determines that the electric hydraulic pressure generation unit is in abnormal state if a time variation amount of the motor current is equal to or more than the predetermined variation amount threshold value.

2. The vehicle braking force generator as set forth in claim 1, wherein the determination unit determines that the electric hydraulic pressure generation unit is in abnormal state if the movement amount is substantially constant.

3. The vehicle braking force generator as set forth in claim 1, wherein
the abnormality determination range is a range in which the brake hydraulic pressure is less than a predetermined hydraulic pressure threshold value, and
when the electric motor is driven according to the operation amount of the braking operation member, the determination unit determines that the electric hydraulic pressure generation unit is in abnormal state if the relationship between the motor current and the brake hydraulic pressure belongs to the abnormality determination range and the movement amount is less than the predetermined movement amount threshold value.

4. A vehicle braking force generator comprising:
an electric hydraulic pressure generation unit that includes a cylinder, a piston, and an electric motor which drives the piston via a power transmission mechanism including a speed reducing gear, and when the electric motor is driven according to an operation amount of a braking operation member, by receiving the driving force, the piston moves to a compression direction of a brake fluid with respect to the cylinder via the power transmission mechanism, thereby generating a brake hydraulic pressure corresponding to the operation amount of the brake operation member;
a motor current obtaining unit that obtains a motor current according to the electric motor;
a movement amount obtaining unit that obtains a movement amount of the piston to the compression direction of the brake fluid with respect to the cylinder; and a determination unit that determines an operation state of the electric hydraulic pressure generation unit, wherein when the electric motor is driven according to the operation amount of the braking operation member, the determination unit determines that the electric hydraulic pressure generation unit is in abnormal state if a time variation amount of the motor current is equal to or more than a predetermined variation amount threshold value, and the movement amount is substantially constant.

5. A vehicle braking force generator comprising:

an electric hydraulic pressure generation unit that includes a cylinder, a piston, and an electric motor which drives the piston via a power transmission mechanism including a speed reducing gear, and when the electric motor is driven according to an operation amount of a braking operation member, by receiving the driving force, the piston moves to a compression direction of a brake fluid with respect to the cylinder via the power transmission mechanism, thereby generating a brake hydraulic pressure corresponding to the operation amount of the brake operation member;

a motor current obtaining unit that obtains a motor current according to the electric motor;

a movement amount obtaining unit that obtains a movement amount of the piston to the compression direction of the brake fluid with respect to the cylinder; and a determination unit that determines an operation state of the electric hydraulic pressure generation unit, wherein when the electric motor is driven according to the operation amount of the braking operation member, the determination unit determines that the electric hydraulic pressure generation unit is in abnormal state if a time variation amount of the motor current is equal to or more than a predetermined variation amount threshold value, and the movement amount is equal to or more than a predetermined movement amount threshold value and substantially constant.

* * * * *